US009275278B2

(12) United States Patent  (10) Patent No.: US 9,275,278 B2
Liu et al. (45) Date of Patent: Mar. 1, 2016

(54) SYSTEMS AND METHODS FOR IMPLEMENTING AND USING OFF-CENTER EMBEDDED MEDIA MARKERS

(71) Applicant: FUJI XEROX CO., LTD., Tokyo (JP)

(72) Inventors: Qiong Liu, Cupertino, CA (US); Lynn Donelle Wilcox, Redwood City, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 354 days.

(21) Appl. No.: 13/769,270

(22) Filed: Feb. 15, 2013

(65) Prior Publication Data

US 2014/0233789 A1 Aug. 21, 2014

(51) Int. Cl.
G06K 9/00 (2006.01)
G06K 9/20 (2006.01)

(52) U.S. Cl.
CPC .......... *G06K 9/00442* (2013.01); *G06K 9/2063* (2013.01); *G06K 2209/01* (2013.01)

(58) Field of Classification Search
CPC ...................................................... G06K 9/00
USPC ........................................................ 382/103
See application file for complete search history.

(56) References Cited

U.S. PATENT DOCUMENTS

| 8,861,864 | B2 * | 10/2014 | Hong et al. | 382/190 |
|---|---|---|---|---|
| 2007/0047818 | A1 * | 3/2007 | Hull et al. | 382/190 |
| 2007/0101364 | A1 * | 5/2007 | Morita | 725/38 |
| 2008/0180550 | A1 * | 7/2008 | Gulliksson | 348/231.99 |
| 2011/0154174 | A1 * | 6/2011 | Liu et al. | 715/205 |
| 2012/0037695 | A1 * | 2/2012 | Liu et al. | 235/375 |
| 2012/0069383 | A1 * | 3/2012 | Hine et al. | 358/1.14 |
| 2012/0269439 | A1 | 10/2012 | Liao et al. | |
| 2013/0080888 | A1 * | 3/2013 | Audet et al. | 715/277 |

OTHER PUBLICATIONS

Embedded Media Marker: Linking Multimedia to Paper. Qiong Liu, Chunyuan Liao, Lynn Wilcox, Anthony Dunnigan, Bee Liew. May 2010.*
Embedded Media Markers: Marks on Paper that Signify Associated Media. Qiong Liu, Chunyuan Liao, Lynn Wilcox, Anthony Dunnigan, Bee Liew. Dec. 2009.*
Qiong Liu, Chunyuan Liao, Lynn Wilcox, Anthony Dunnigan, Bee Liew, Embedded Media Markers: Marks on Paper that Signify Associated Media, Proc. of ACM, Apr. 4-9, 2009, pp. 1-10.
Fiduciary marker. Wikipedia, last modified Nov. 1, 2012 at 17:10, Wikimedia Foundation, Inc. accessed Feb. 18, 2013, <http://en.wikipedia.org/w/index.php?title.Fiduciary marker>.

* cited by examiner

*Primary Examiner* — Stephen R Koziol
*Assistant Examiner* — Delomia L Gilliard
(74) *Attorney, Agent, or Firm* — TransPacific Law Group; Pavel I. Pogodin, Esq.

(57) ABSTRACT

Provided is an off-center embedded media marker, which may have a form of an iconic marker printed outside the boundary of a region of interest in a document or other article and indicating an available media object or a function associated with the aforesaid region of interest. This marker is used by defining a sight element with the boundary shape of the marker near the edge of a viewable portion of a display, aligning the sight element with the marker and capturing an image of a predetermined region of the document without using a visible region boundary on the hardcopy document. The media or function associated with the marker is automatically determined by performing a feature-based analysis of the captured image similarly to the techniques developed in connection with the conventional embedded media markers. Upon the determination, the associated media is retrieved of the associated function is performed.

33 Claims, 18 Drawing Sheets

SYSTEMS AND METHODS FOR IMPLEMENTING AND USING OFF-CENTER EMBEDDED MEDIA MARKERS

BACKGROUND OF THE INVENTION

1. Technical Field

The disclosed embodiments relate in general to systems and methods for generating and using embedded media markers, which signify existence of media or function associated with a part of a document as well as articles embodying such embedded media markers, and, more particularly, to systems and methods for implementing and using off-center embedded media markers and articles containing them.

2. Description of the Related Art

Conventional embedded media markers, or simply EMMs, are nearly transparent iconic marks printed on paper documents or other tangible articles that signify the existence of media associated with a specific part of the document. For example, U.S. Patent Application Publication No. 2011/0154174 discloses a system and method for generating and using such embedded media markers. By using a semi-transparent boundary that encompasses the signified document patch with enough visual features, a conventional embedded media marker can guide users' camera operations for media retrieval. Users take a picture of the embedded media marker-signified document patch using a smartphone camera, and the media associated with the marker-signified document location is automatically displayed on the smartphone's display. In other words, the embedded media marker operates substantially similarly to a link to a local or external media object related to the article embodying the embedded media marker or any specific part thereof.

However, the conventional media markers are intrusive because they must be printed over features of the document and may visually interfere with the appearance of the affected document features. Thus, less intrusive alternatives to the conventional embedded media markers are desirable.

SUMMARY OF THE INVENTION

The embodiments described herein are directed to methods and systems that substantially obviate one or more of the above and other problems associated with conventional embedded media markers.

In accordance with one aspect of the inventive concepts described herein, there is provided a computer-implemented method performed in a computerized system incorporating a central processing unit, a display device, a camera and a memory. The aforesaid method is performed in connection with an article embodying a content provided on the surface of the article and a marker, the marker being associated with a first portion of the content provided on the surface of the article. The aforesaid marker is disposed outside of the associated first portion of the content on the surface of the article. The inventive method involves: using the display device to generate a graphical user interface, the user interface comprising a sight element and a live video portion; upon alignment of the sight element and the marker, using the camera to acquire an image of a second portion of the content within a field of view of the camera; extracting a plurality of image features from the acquired image; and using the extracted plurality of image features to identify a media or a function associated with the marker.

In accordance with another aspect of the inventive concepts described herein, there is provided a computer-implemented method performed in a computerized system incorporating a central processing unit, a display device, a camera and a memory. The aforesaid method is performed in connection with an article embodying a content provided on the surface of the article and a marker, the marker being associated with a first portion of the content provided on the surface of the article. The aforesaid marker is disposed outside of the associated first portion of the content on the surface of the article. The inventive method involves: using the display device to generate a graphical user interface, the user interface comprising a sight element and a live video portion; upon alignment of the sight element and the marker, using the camera to acquire an image of a second portion of the content within a field of view of the camera; transmitting the acquired image to a computerized server system for analysis; and receiving from the computerized server system information on the identity of a media or a function associated with the marker.

In accordance with yet another aspect of the inventive concepts described herein, there is provided an article including: content provided on a surface of the article; and a marker provided on the surface of the article. The aforesaid marker is associated with a first portion of the content provided on the surface of the article, the marker being disposed outside of the associated first portion of the content on the surface of the article. In the inventive article, the size and an orientation of the marker is such that upon alignment of the marker with an element of a graphical user interface of an electronic device having a camera, the camera of the electronic device is positioned to acquire an image of a second portion of the content provided on the surface of the article, the second portion of the content comprising a number of image features sufficient to allow automated identification of the marker and the first portion of the content by extracting the number of image features and using the extracted number of image features for the identification of the marker and the first portion of the content.

In accordance with yet another aspect of the inventive concepts described herein, there is provided a computer-implemented method performed in a computerized system incorporating a central processing unit and a memory, the method being performed in connection with an article comprising a content provided on the surface of the article. The inventive method involves: receiving a selection of a first portion of the content; receiving a selection of a position of a marker; determining a size and orientation of the marker; placing the marker at the received position of the marker using the determined size and orientation of the marker; estimating a second portion of the content, wherein an image of the second portion of the content would be acquired upon alignment of the marker with an element of a graphical user interface of an electronic device comprising a camera; counting a number of visual features in the second portion of the content; and determining whether the counted number of visual features is sufficient for identification of the marker.

In accordance with yet another aspect of the inventive concepts described herein, there is provided a non-transitory computer-readable medium embodying a set of computer-executable instructions, which, when executed in a computerized system incorporating a central processing unit, a display device, a camera and a memory, in connection with an article comprising a content provided on the surface of the article and a marker, the marker being associated with a first portion of the content provided on the surface of the article, the marker being disposed outside of the associated first portion of the content on the surface of the article, cause the computerized system to perform a method involving: using the display device to generate a graphical user interface, the user interface including a sight element and a live video portion; upon alignment of the sight element and the marker, using the camera to acquire an image of a second portion of the content within a field of view of the camera; extracting a plurality of image features from the acquired image; and using the extracted plurality of image features to identify a media or a function associated with the marker.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
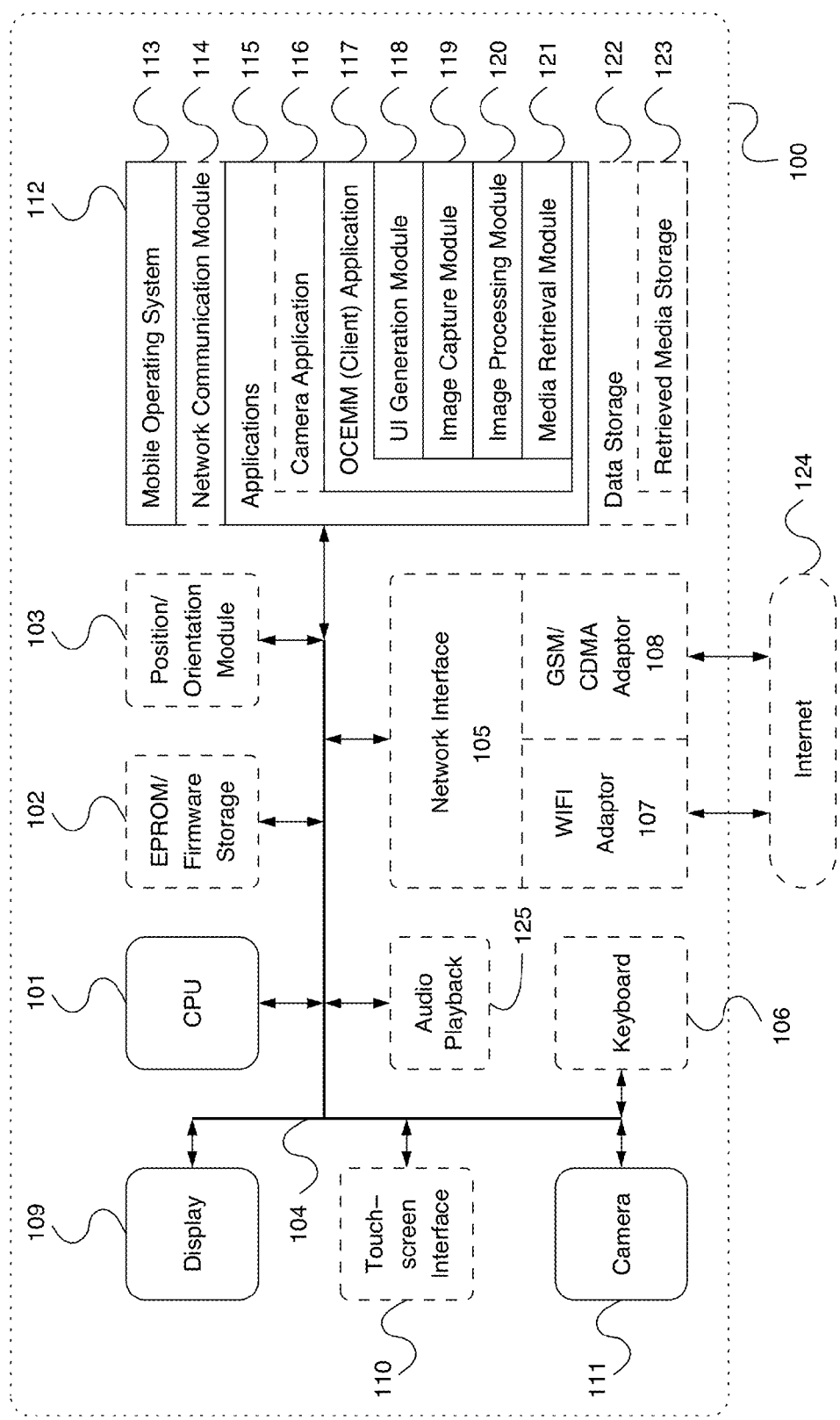
FIG. 1 illustrates an exemplary embodiment of a computerized system used in connection with off-center embedded media markers.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In one or more embodiments, there is provided an off-center embedded media marker (OCEMM or simply marker), which may have a form of an iconic marker printed outside the boundary of a region of interest in a document or other article and indicating an available media object or a function associated with the aforesaid region of interest. This marker is used by defining a sight element with the boundary shape of the marker near the edge of a viewable portion of a display, aligning the sight element with the marker and capturing an image of a predetermined region of the document without using a visible region boundary on the hardcopy document. The media or function associated with the marker is determined by performing a feature-based analysis of the captured image similarly to the techniques developed in connection with the conventional embedded media markers.

While in the below specification references are frequently made to embedded media markers being placed on paper documents, it should be understood that any tangible articles of any kind or even images displayed on display units of various electronic devices, including, without limitation, electronic paper, also referred to as e-paper, or devices based on electronic ink, all of which are well known to persons of skill in the art, may be used in place of paper documents to display the embedded media markers. The articles carrying the described off-center embedded media markers may include, without limitation, paper documents, product packaging, products, posters, billboards, garments, displays of electronic devices and the like. Thus, the inventive concepts described herein are not limited to the specific type or types of articles embodying the described off-center embedded media markers.

In addition, while in many cases, the described off-center embedded media marker is associated with a media object, it should be noted that the inventive marker may also be linked to other content, a tool or a function executable by the computerized system 100. Thus, the inventive techniques described herein are not limited by the type of the subject matter associated with the off-center embedded media markers.

FIG. 1 illustrates an exemplary embodiment of a computerized system 100 for retrieving media associated with off-center embedded media markers and providing the retrieved media to the user. In one or more embodiments, the computerized system 100 may be implemented within the form factor of a mobile computing device, such as a smartphone, a personal digital assistant (PDA), or a tablet computer, all of which are available commercially and are well known to persons of skill in the art. In an alternative embodiment, the computerized system 100 may be implemented based on a laptop or a notebook computer. Yet in an alternative embodiment, the computerized system 100 may be an embedded system, incorporated into an electronic device with certain specialized functions, such as an electronic book (or e-book) reader. Yet in an alternative embodiment, the computerized system 100 may be implemented as a part of an augmented reality head-mounted display (HMD) systems, such as Google glass, also well known to persons of ordinary skill in the art.

The computerized system 100 may include a data bus 104 or other interconnect or communication mechanism for communicating information across and among various hardware components of the computerized system 100, and a central processing unit (CPU or simply processor) 101 coupled with the data bus 104 for processing information and performing other computational and control tasks. Computerized system 100 also includes a memory 112, such as a random access memory (RAM) or other dynamic storage device, coupled to the data bus 104 for storing various information as well as instructions to be executed by the processor 101. The memory 112 may also include persistent storage devices, such as a magnetic disk, optical disk, solid-state flash memory device or other non-volatile solid state storage devices.

In one or more embodiments, the memory 112 may also be used for storing temporary variables or other intermediate information during execution of instructions by the processor 101. Optionally, computerized system 100 may further include a read only memory (ROM or EPROM) 102 or other static storage device coupled to the data bus 104 for storing static information and instructions for the processor 101, such as firmware necessary for the operation of the computerized system 100, basic input-output system (BIOS), as well as various configuration parameters of the computerized system 100.

In one or more embodiments, the computerized system 100 may incorporate a display device 109, which may be also coupled to the data bus 104, for displaying various information to a user of the computerized system 100. In an alternative embodiment, the display 109 may be associated with a graphics controller and/or graphics processor (not shown). The display device 109 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 109 may be incorporated into the same general enclosure with the remaining components of the computerized system 100. In an alternative embodiment, the display device 109 may be positioned outside of such enclosure.

In one or more embodiments, the display device 109 may be implemented in a form of a projector or a mini-projector configured to project information on various objects, such as glasses worn by the user. In one or more embodiments, the display device 109 may be configured to be mountable on the head of the user. To this end, the display device 109 may be provided with suitable mounting hardware (not shown).

In one or more embodiments, the computerized system 100 may further incorporate an audio playback device 125 connected to the data bus 104 and configured to play various audio files, such as MPEG-3 files, or audio tracks of various video files, such as MPEG-4 files, well known to persons of ordinary skill in the art. To this end, the computerized system 100 may also incorporate waive or sound processor or a similar device (not shown).

In one or more embodiments, the computerized system 100 may incorporate one or more input devices, such as a touch-screen interface 110 for receiving user's tactile commands, a camera 111 for acquiring still images and video of various objects, as well as a keyboard 106, which all may be coupled to the data bus 104 for communicating information, including, without limitation, images and video, as well as user command selections to the processor 101. In an alternative embodiment, input devices may include a system for tracking eye movements of the user (not shown), which may be used to indicate to the computerized system 100 the command selection made by the user.

In one or more embodiments, the computerized system 100 may additionally include a positioning and orientation module 103 configured to supply data on the current geographical position and spatial orientation of the computerized system 100 to the processor 101 via the data bus 104. The geographical position information may be obtained by the positioning module 103 using, for example, global positioning system (GPS) technology and/or other positioning techniques such as by using information provided by proximate cell towers and/or WIFI hotspots. The orientation information may be obtained using acceleration measurements in all 3 axes, including the gravity.

In one or more embodiments, the computerized system 100 may additionally include a communication interface, such as a network interface 105 coupled to the data bus 104. The network interface 105 may be configured to establish a connection between the computerized system 100 and the Internet 124 using at least one of WIFI interface 107 and the cellular network (GSM or CDMA) adaptor 108. The network interface 105 may be configured to provide a two-way data communication between the computerized system 100 and the Internet 124. The WIFI interface 107 may operate in compliance with 802.11a, 802.11b, 802.11g and/or 802.11n protocols as well as Bluetooth protocol well known to persons of ordinary skill in the art. In an exemplary implementation, the WIFI interface 107 and the cellular network (GSM or CDMA) adaptor 108 send and receive electrical or electromagnetic signals that carry digital data streams representing various types of information.

In one or more embodiments, the Internet 124 typically provides data communication through one or more sub-networks to other network resources. Thus, the computerized system 100 is capable of accessing a variety of network resources located anywhere on the Internet 124, such as remote media servers, web servers, other content servers as well as other network data storage resources. In one or more embodiments, the computerized system 100 is configured send and receive messages, media and other data, including application program code, through a variety of network(s) including Internet 124 by means of the network interface 105. In the Internet example, when the computerized system 100 acts as a network client, it may request code or data for an application program executing on the computerized system 100. Similarly, it may send various data or computer code to other network resources.

In one or more embodiments, the functionality described herein is implemented by computerized system 100 in response to processor 101 executing one or more sequences of one or more instructions contained in the memory 112. Such instructions may be read into the memory 112 from another computer-readable medium. Execution of the sequences of instructions contained in the memory 112 causes the processor 101 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 101 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 101 for execution. For example, the instructions may initially be carried on a magnetic disk from a remote computer. Alternatively, a remote computer can load the instructions into its dynamic memory and send the instructions over the Internet 124. Specifically, the computer instructions may be downloaded into the memory 112 of the computerized system 100 from the foresaid remote computer via the Internet 124 using a variety of network data communication protocols well known in the art.

In one or more embodiments, the memory 112 of the computerized system 100 may store any of the following software programs, applications or modules:

1. Operating system (OS) 113, which may be a mobile operating system for implementing basic system services and managing various hardware components of the computerized system 100. Exemplary embodiments of the operating system 113 include, without limitation, Android, iOS, Windows and Windows Mobile and Linux, which are all well known to persons of skill in the art, as well as any other now known or later developed operating system.

2. Network communication module 114 may incorporate, for example, one or more network protocol stacks which are used to establish a networking connection between the computerized system 100 and the various network entities of the Internet 124, such as a computerized server system 200 shown in FIG. 2, using the network interface 105 as well as the WIFI interface 107 and/or the cellular (GSM/CDMA) adaptor 108.

3. Applications 115 may include, for example, a set of software applications executed by the processor 101 of the computerized system 100, which cause the computerized system 100 to perform certain predetermined functions, such as acquire digital images using the camera 111 (the camera application 116) or play media files using the display 109 and/or an audio playback device (not shown). In one or more embodiments, the applications 115 may include an inventive off-center embedded media marker application 117.

4. Data storage 122 may be used, for example, for storing media files as well as other data received by the computerized system 100 over the Internet 124.

In one or more embodiments, the inventive off-center embedded media marker application 117 may incorporate a graphical user interface generation module 118 configured to generate an inventive graphical user interface on the display 109 of the computerized system 100. The inventive off-center embedded media marker application 117 may further include an image capture module 119 for acquiring an image of at least a portion of the article, an image processing module 120 and media retrieval module 121. The operation of the aforesaid modules of the inventive off-center embedded media marker application 117 will be described in detail below.

Figure 2:
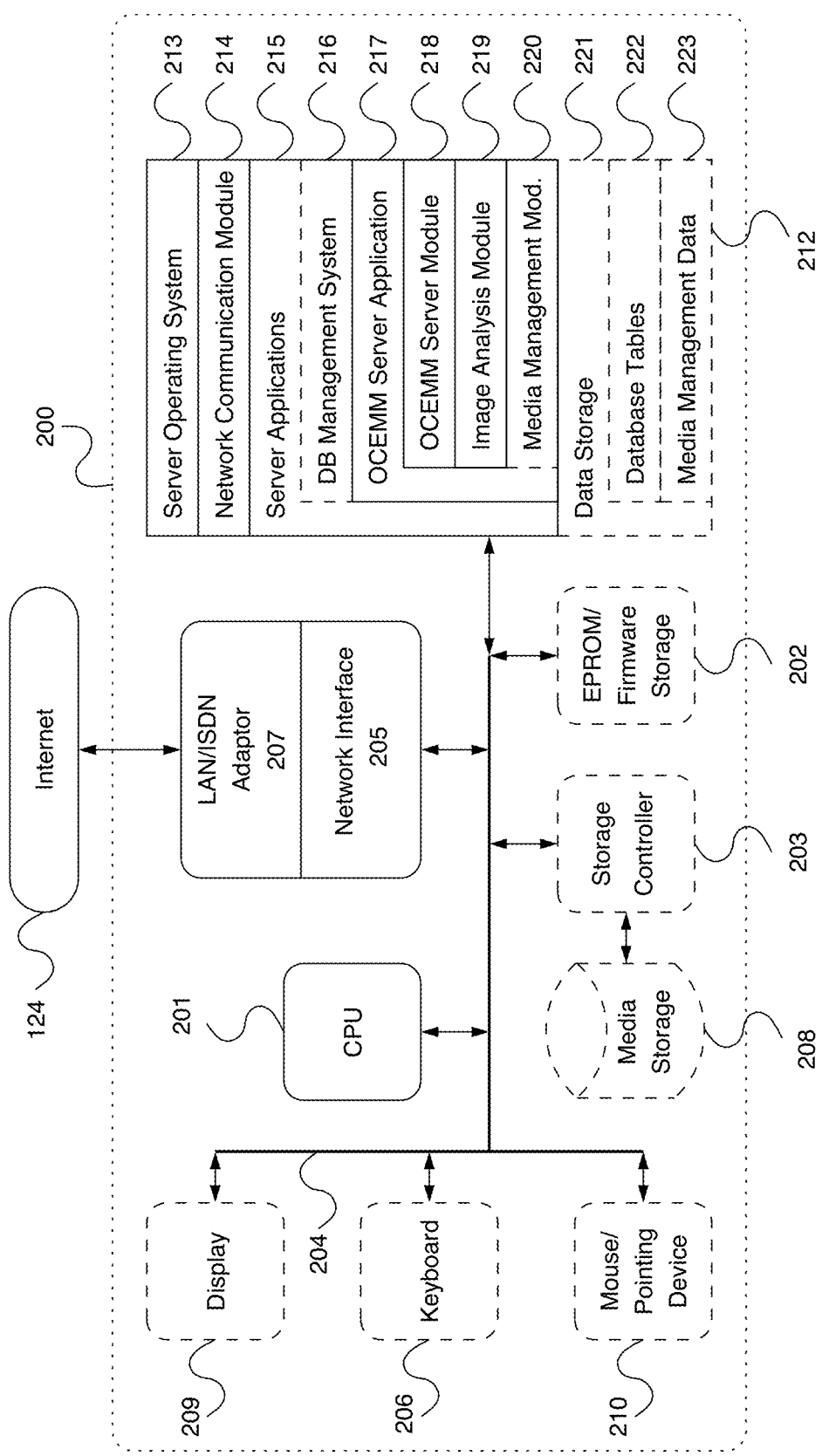
FIG. 2 illustrates an exemplary embodiment of a computerized server system upon which at least some aspects of one or more embodiments of the invention may be deployed.

In one or more embodiments, the image of the at least a portion of the article acquired by the image capture module 119 is analyzed locally, in the image processing module 120 of the computerized system 100. However, as would be appreciated by those of skill in the art, the local image analysis may demand substantial image processing power, which may not be available in the computerized system 100. Therefore, in an alternative embodiment, the acquired image may be sent for analysis to a remote server, such as the computerized server system 200, en exemplary embodiment of which is illustrated in FIG. 2.

In one or more embodiments, the computerized server system 200 may incorporate a data bus 204, which may be substantially similar and may perform substantially similar functions as the data bus 104 of the computerized system 100 illustrated in FIG. 1. In various embodiments, the data bus 204 may use the same or different interconnect and/or communication protocol as the data bus 104. The one or more processors (CPUs) 201, the network interface 205, the EPROM/Firmware storage 202, the display 209 and the keyboard 206 of the computerized server system 200 may be likewise substantially similar to the respective processor 101, the network interface 105, the EPROM/Firmware storage 102, the display 109 and the keyboard 106 of the computerized system 100, except that the former components are deployed in a server platform configuration. In various implementations, the one or more processor 201 may have substantially increased processing power as compared with the processor 101.

In addition to the input device 206 (keyboard), the computerized server system 200 may additionally include a cursor control device 210, such as a mouse, a trackball, or cursor direction keys for communicating direction information and command selections to processor 201 and for controlling cursor movement on display 209. This input device typically has two degrees of freedom in two axes, a first axis (e.g., x) and a second axis (e.g., y), that allows the device to specify positions in a plane.

The LAN/ISDN adaptor 207 of the computerized server system 200 may be implemented, for example, using an integrated services digital network (ISDN) card or a modem to provide a data communication connection to a corresponding type of telephone line, which is interfaced with the Internet 124 using Internet service provider's hardware (not shown). As another example, the LAN/ISDN adaptor 207 may be a local area network interface card (LAN NIC) to provide a data communication connection to a compatible LAN and the Internet 124. To store various media files, the computerized server system 200 may be provided with a media storage 208 connected to the data bus 204 by means of a storage controller 203.

In one or more embodiments, the memory 212 of the computerized server system 200 may store any of the following software programs, applications or modules:

1. Server operating system (OS) 213, which may be an operating system for implementing basic system services and managing various hardware components of the computerized server system 200. Exemplary embodiments of the server operating system 213 include, without limitation, Linux, Unix, Windows Server, FreeBSD, NetBSD, Mac OSX Server, HP-UX, AIX and Solaris, which are all well known to persons of skill in the art, as well as any other now known or later developed operating system.

2. Network communication module 214 may incorporate, for example, one or more network protocol stacks which are used to establish a networking connection between the computerized server system 200 and the various network entities of the Internet 124, such as the computerized system 100, using the network interface 205 working in conjunction with the LAN/ISDN adaptor 207.

3. Server applications 215 may include, for example, a set of software applications executed by one or more processors 201 of the computerized server system 200, which cause the computerized server system 200 to perform certain predetermined functions or tasks. In one or more embodiments, the server applications 215 may include a database management system (DBMS) 216 comprising a set of software programs enabling storage, modification, and extraction of various data from a database. In one or more embodiments, the server applications 215 may additionally include an inventive off-center embedded media marker server application 217. The database management system 216 may be implemented based on any now known or later developed type of database software, such as a relational database management system, including, without limitation, MySQL, Oracle, SQL Server, DB2, SQL Anywhere, PostgreSQL, SQLite, Firebird and/or MaxDB, which are well-known to persons of skill in the art. In an alternative embodiment, a cloud-based distributed database, such as Amazon Relational Database Service (Amazon RDS), well known to persons of ordinary skill in the art, may also be used to implement the database management system 216.

4. Data storage 221 may be used, for example, for storing database tables managed by the database management system 216 as well as media management metadata associated with media object files stored in the media storage 208. One example of such media management metadata is media object files indexing information, which may be used for fast retrieval of media files from the media storage 208.

In one or more embodiments, the inventive off-center embedded media marker server application 217 may incorporate an off-center embedded media marker server module 218 configured to receive image(s) associated with a particular off-center embedded media marker sent for analysis by the computerized system 100 and provide responsive data back to the computerized system 100. An image analysis module 219 may be provided to perform analysis of the received image(s) and, based on the results of the aforesaid image analysis, identify media object(s) associated with the particular off-center embedded media marker. In one or more embodiments, the media object identifying information is provided back to the computerized system 100 by the off-center embedded media marker server module 218. In one or more embodiments, the media object identifying information is a uniform resource locator (URL) of the media object. After the computerized system 100 receives the media object identifying information from the computerized server system 200, it is capable of retrieving the media object from a separate Internet storage location (not shown) using the received media object identifying information. In one or more embodiments, the communications between the computerized system 100 and the computerized server system 200 are carried out in accordance with HTTP protocol well known to persons of ordinary skill in the art.

In an alternative embodiment, the media object itself may be provided by the computerized server system 200 to the computerized system 100 in place of the aforesaid media object identifying information. To this end, the computerized server system 200 may be configured to retrieve the media object associated with the particular off-center embedded media marker from the media storage 208. In this implementation, the server applications 215 may include a media management module 220 configured to manage the media object files stored in the media storage 208.

Figure 3:
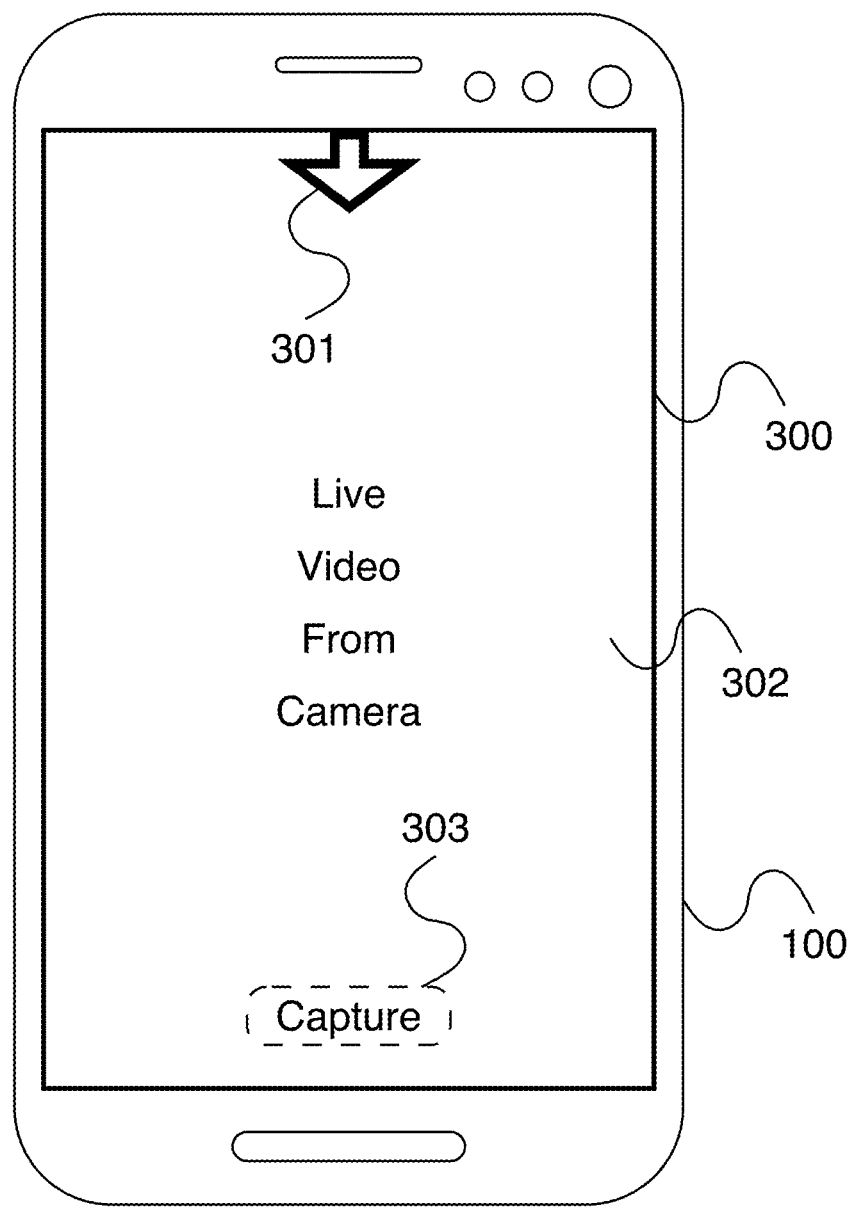
FIG. 3 illustrates an exemplary embodiment of a graphical user interface generated by a graphical user interface generation module.

FIG. 3 illustrates an exemplary embodiment of a graphical user interface (GUI) 300 generated by the inventive graphical user interface generation module 118 on the display 109 of the computerized system 100. As shown in FIG. 3, the graphical user interface 300 may incorporate a sight element 301. In various embodiments, the sight element 301 may be implemented in various shapes, sizes, colors and orientations. In one or more embodiments, the sight element 301 is characterized by its shape, size, color (including texture) and orientation. In one or more embodiments, the shape of the sight element 301 generally follows the shape of the off-center embedded media marker printed on the document or other article. In one or more embodiments, the sight element 301 has the exact shape of the off-center embedded media marker. In various embodiments, the sight element 301 may be positioned at different locations within the viewable area of the display 109. In one or more embodiments, the sight element 301 is positioned in the proximity of a boundary of a viewable area of the display 109.

In one or more embodiments, the graphical user interface 300 generated by the inventive graphical user interface generation module 118 is configured to display a live video taken by the camera 111 of the computerized system 100 in the area 302 shown in FIG. 3. When the user points the camera 111 at an article containing an off-center embedded media marker, the live video of at least a portion of the article within the field of view of the camera 111 is shown in the aforesaid area 302 of the graphical user interface 300 to enable the user to align the sight element 301 with the off-center embedded media marker on the article.

Additionally, in one or more embodiments, the graphical user interface 300 generated by the inventive graphical user interface generation module 118 may incorporate an image capture button 303. In response to the user activating this button 303, after aligning the sight 301 with the off-center embedded media marker on the article, the image capture module 119 of the inventive off-center embedded media marker application 117 captures the image of a portion of the article within the field of view (also referred to herein as image capture region) of the camera 111. In an alternative embodiment, the computerized system 100 may be configured to automatically detect the alignment of the sight element 301 and the off-center embedded media marker 401 and, upon detection of the proper alignment, issue a command to the image capture module 119 to acquire an image of the article using the camera 111. It should be noted that in various embodiments, the aforesaid image capture region may or may not coincide with the aforesaid region of interest.

Figure 4:
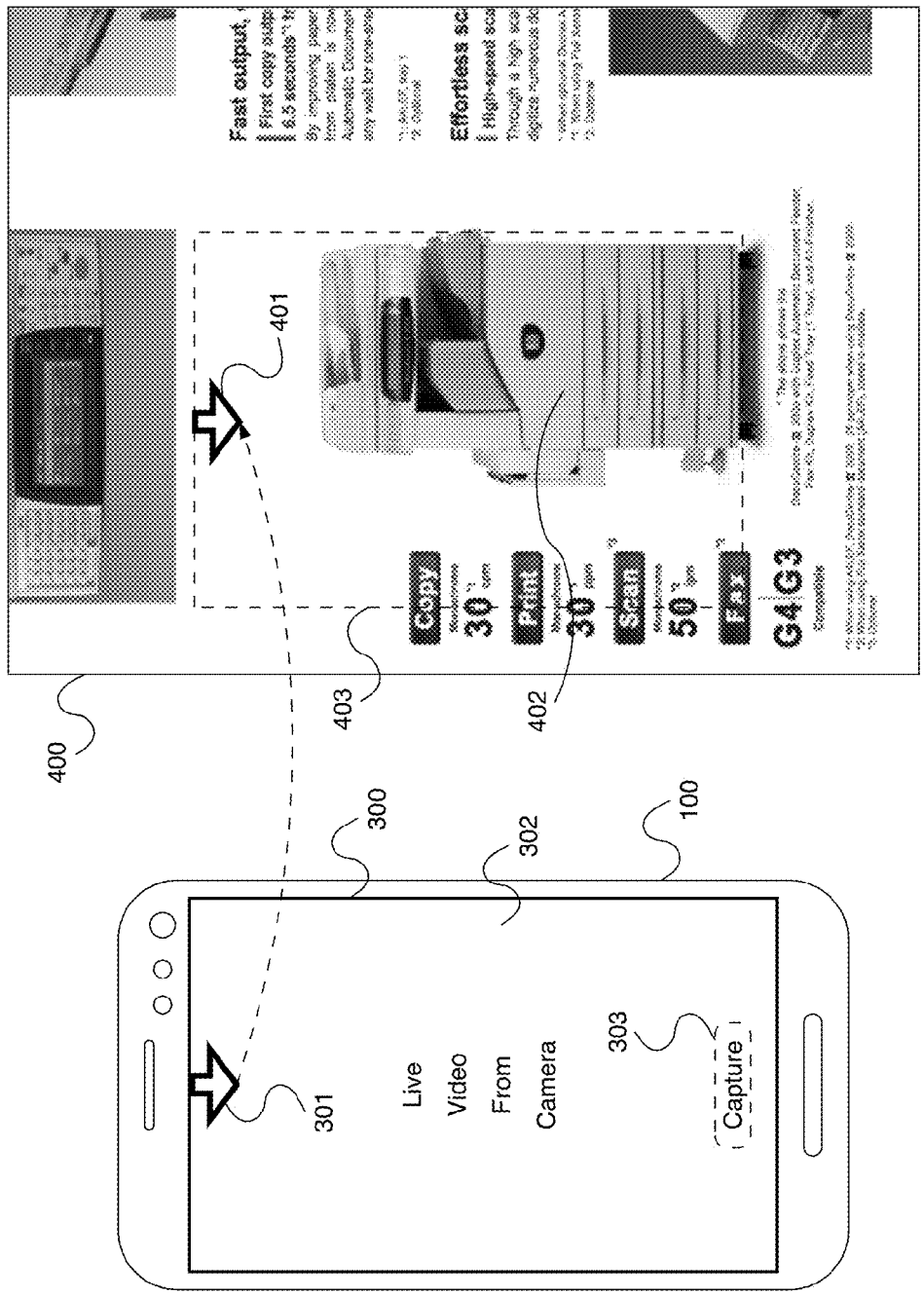
FIG. 4 illustrates a manner of use of the graphical user interface of FIG. 3 in connection with an exemplary embodiment of an off-center embedded media marker.

An exemplary embodiment of an off-center embedded media marker as well the manner of use of the graphical user interface 300 in connection with such marker is illustrated in FIG. 4. In the shown exemplary embodiment, the off-center embedded media marker is an iconic marker 401 printed generally outside the boundary of a region of interest 402 on a paper document 400 or other suitable article and indicating to the user an available media object associated with the aforesaid region of interest 402. When the user aligns the sight element 301 with the off-center embedded media marker 401 by viewing the live video of the off-center embedded media marker in the live video region 302 of the graphical user interface 300 and suitably moving the camera to achieve the alignment, the field of view 403 of the camera 111 is configured to cover the region of interest 402, enabling the camera 111 to acquire an image of this region.

As it would be appreciated by those of skill in the art, by defining the sight element 301 with the boundary shape of the off-center embedded media marker 401 near the boundary of the viewable portion of the display 109 and aligning the sight element 301 and the corresponding off-center embedded media marker 401 enables the camera 111 to accurately locate and capture a predefined region 402 within a field of view 403 of the camera 111 without having to use a visible region boundary on the hardcopy document 400 or on any other article. It should be emphasized that while the field of view boundary 403 of the camera 111 is illustrated in FIG. 4, in real life it is not visible to the user and is not printed on the document 400 or on any other article. Thus, the image capture method described above enables retrieval of multimedia information associated with the predefined region of interest 402 without intrusive visual boundary printing. In other words, by using the inventive sight element 301 and aligning it with the off-center embedded media marker 401, the field of view 403 of the camera 111 is automatically mapped to the predetermined region of interest 402 without the need to use a visible region boundary.

It should be understood that unlike the conventional embedded media markers, the inventive off-center embedded media markers need not be printed very close to the associated region of interest. Moreover, because the off-center embedded media markers are normally much smaller than the conventional media marker capture boundary, changing the size of the marker by the same ratio will affect much smaller area of the document than in a case of the conventional embedded media marker. For this reason, the inventive off-center embedded media markers are less intrusive than the conventional embedded media markers.

In various embodiments, in order to facilitate image capture, there are multiple ways to arrange the sight elements 301 within the viewable portion of the display 109. For example, the sight element 301 may be arranged at any angle. In one or more embodiments, the sight element 301 and the off-center embedded media marker 401 are both characterized by shape, color, orientation and size. In this embodiment, the location, size and orientation of the inventive off-center embedded media marker 401 placed on the document 400 uniquely determines the region of the document 400, the image of which is captured by the camera 111 of the computerized system 100 when the sight element 301 is aligned with the marker 401, which facilitates the correct image acquisition. In one or more embodiments, the off-center embedded media marker printed on the document is a directional or an asymmetric marker, such as the arrow-like marker 401 shown in FIG. 4, which points in the direction of the region of interest. As it would be understood, such markers facilitate the user's ability to quickly identify the region of interest. It should be also noted that, as stated above, the sight element 301 may generally follow the shape of the marker 401 and also be of a directional or an asymmetric shape, such as the arrow shape of the marker 401 shown in FIG. 4.

Figure 5:
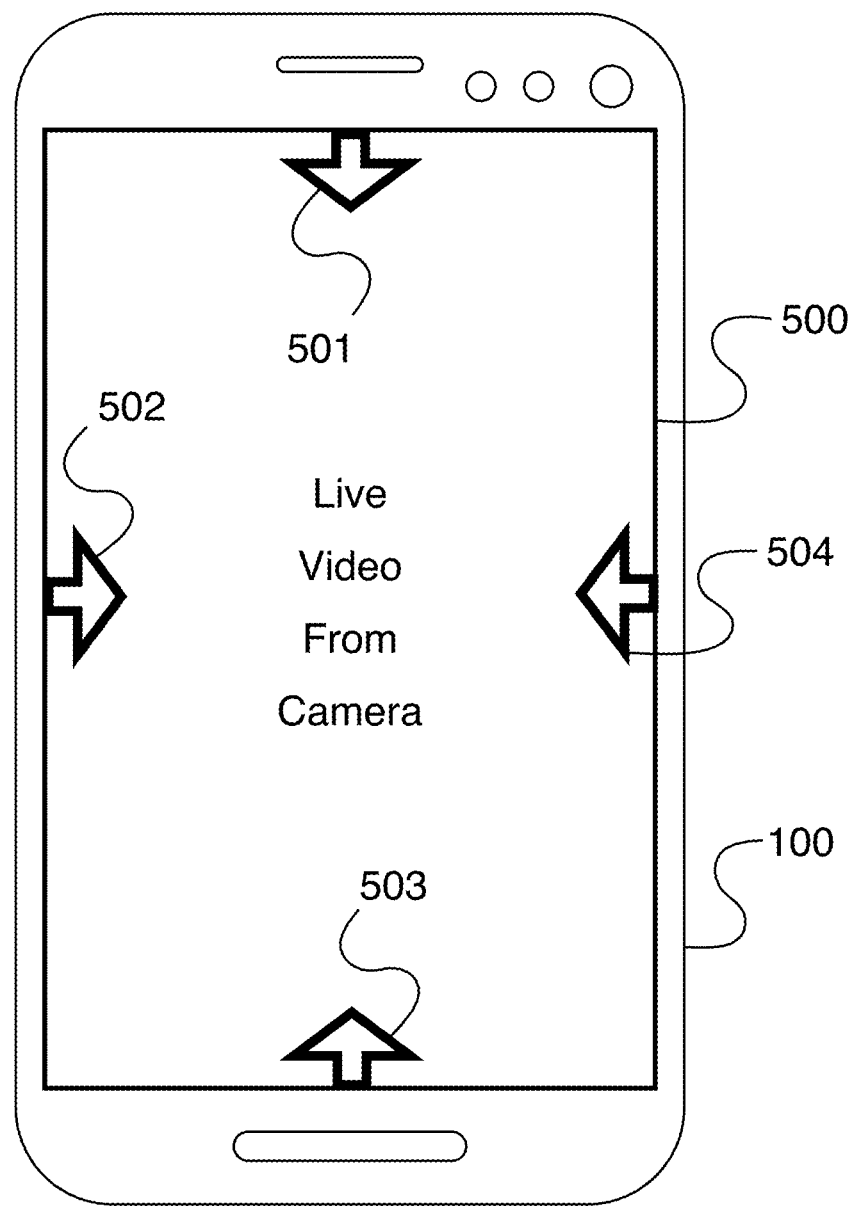
FIG. 5 illustrates another exemplary embodiment of a graphical user interface generated by the graphical user interface generation module.
Figure 6:
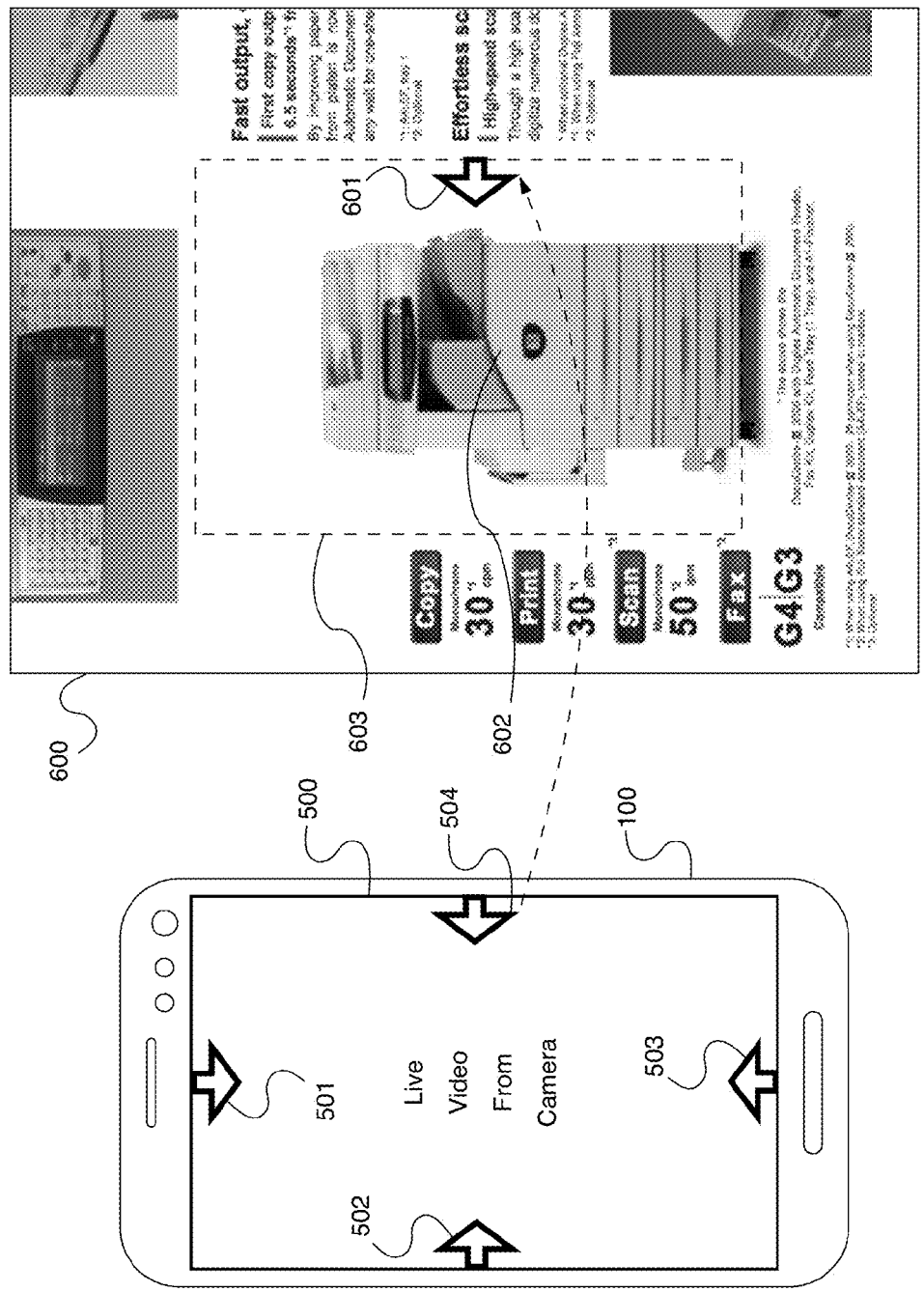
FIG. 6 illustrates a manner of use of the graphical user interface of FIG. 5 in connection with another exemplary embodiment of an off-center embedded media marker.

FIG. 5 illustrates another exemplary embodiment of a graphical user interface 500 generated by the inventive graphical user interface generation module 118 on the display 109 of the computerized system 100. The embodiment 500 incorporates multiple sight element 501, 502, 503 and 504 arranged in different locations of the graphical user interface 500 and oriented at different angles. The user can align one of the shown sight element 501, 502, 503 and 504 with a marker of a matching orientation, for example, as illustrated in FIG. 6. As shown in that figure, the sight element 504 is aligned with an off-center embedded media marker 601 printed on the document 600, which has an orientation similar to the orientation of the sight element 504. On the other hand, the size and orientation of the marker 601 uniquely determines the invisible field of view boundary 603 of the camera 111 of the system 100, while the arrow-like marker 601 points in the direction of the region of interest 602. When the user aligns the sight element 504 with the marker 601, the camera 111 captures the image of the region of interest 602.

Figure 7:
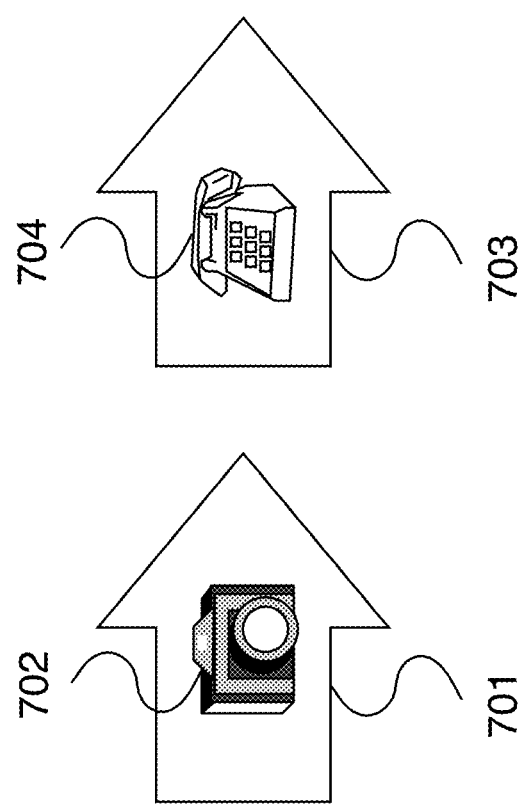
FIG. 7 illustrates exemplary embodiments of off-center embedded media markers decorated with media or function type indicators.

In one or more embodiments, to inform the users about the type of media, other content, tool or function associated with the region of interest designated by the off-center embedded media marker, the marker itself may be decorated with an icon or other graphical element or multiple elements indicative of the type of the associated subject matter, which will be referred herein as media or function type indicator. For example, a marker 701 shown in FIG. 7 is decorated with a media type indicator 702, comprising an icon rendering of a camera, indicating to the user that certain image content associated with the marker may be available for viewing. On the other hand, a marker 703 is decorated with a function type indicator 704, comprising an icon rendering of a telephone, indicating to the user that aligning the sight element with this marker 703 will cause the user's mobile phone to automatically dial a phone number associated with the region of interest pointed to by the marker 703. Is should be noted that the invention is not limited to the shown media or function type indicators and many other types of graphical information may be used in or in connection with markers to designate the associated media, other content, tool or function. It should be also noted that in one or more embodiments, the sight elements of the graphical user interface generated by the module 118 are not similarly decorated. This is because the sight elements are used only for boundary alignment, which only requires the boundary shape of the sight element to be similar to the shape of the marker boundary.

It should be noted that not all sight elements generated by the graphical user interface generation module 118 have the same shape or color. Markers may likewise be of different shapes and colors. One or more embodiments enable users to view different types of media or activate different tools or functions associated with the same region of interest by providing multiple sight and marker types with different shapes, colors, media or function type indicators, as well as other suitable attributes.

Figure 8:
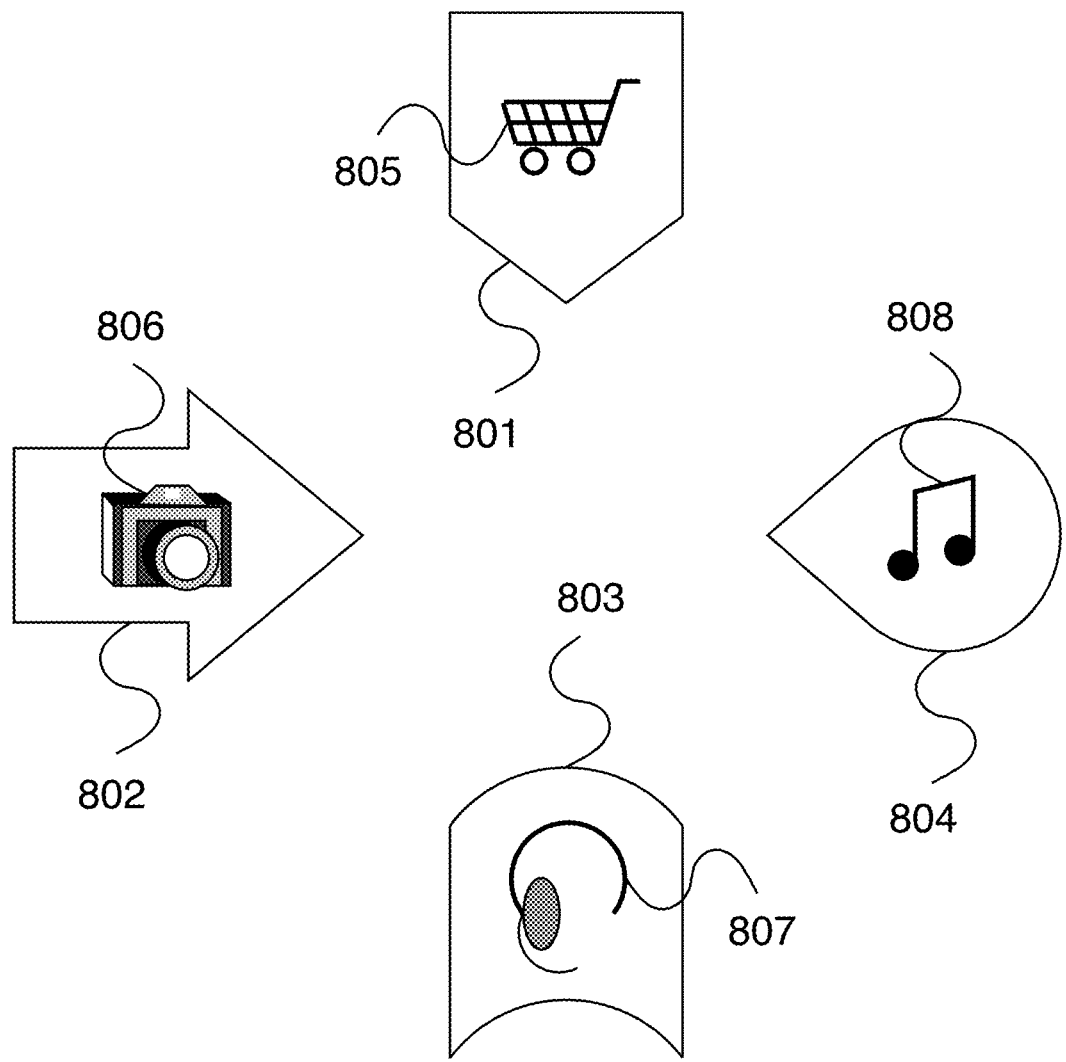
FIG. 8 illustrates exemplary embodiments of different types of sight elements generated by the graphical user interface generation module.

FIG. 8 illustrates exemplary embodiments of different types of sight elements 801, 802, 803 and 804 generated by the graphical user interface generation module 118. The same or substantially similar designs may be used for printing off-center embedded media markers. In various embodiments, either the sight elements, the markers or both of them may be decorated with media or function type indicators 805, 806, 807 and 808 to indicate to the user different types of available media or other content or different types of available tools or functions. In addition, the shapes of the boundaries of the sight elements 801, 802, 803 and 804 and the corresponding markers may be different from one another and may also be used to indicate to the user the types of available media or other content or types of available tools or functions. Finally, the colors of the sight elements and the corresponding markers may also be different.

Figure 9:
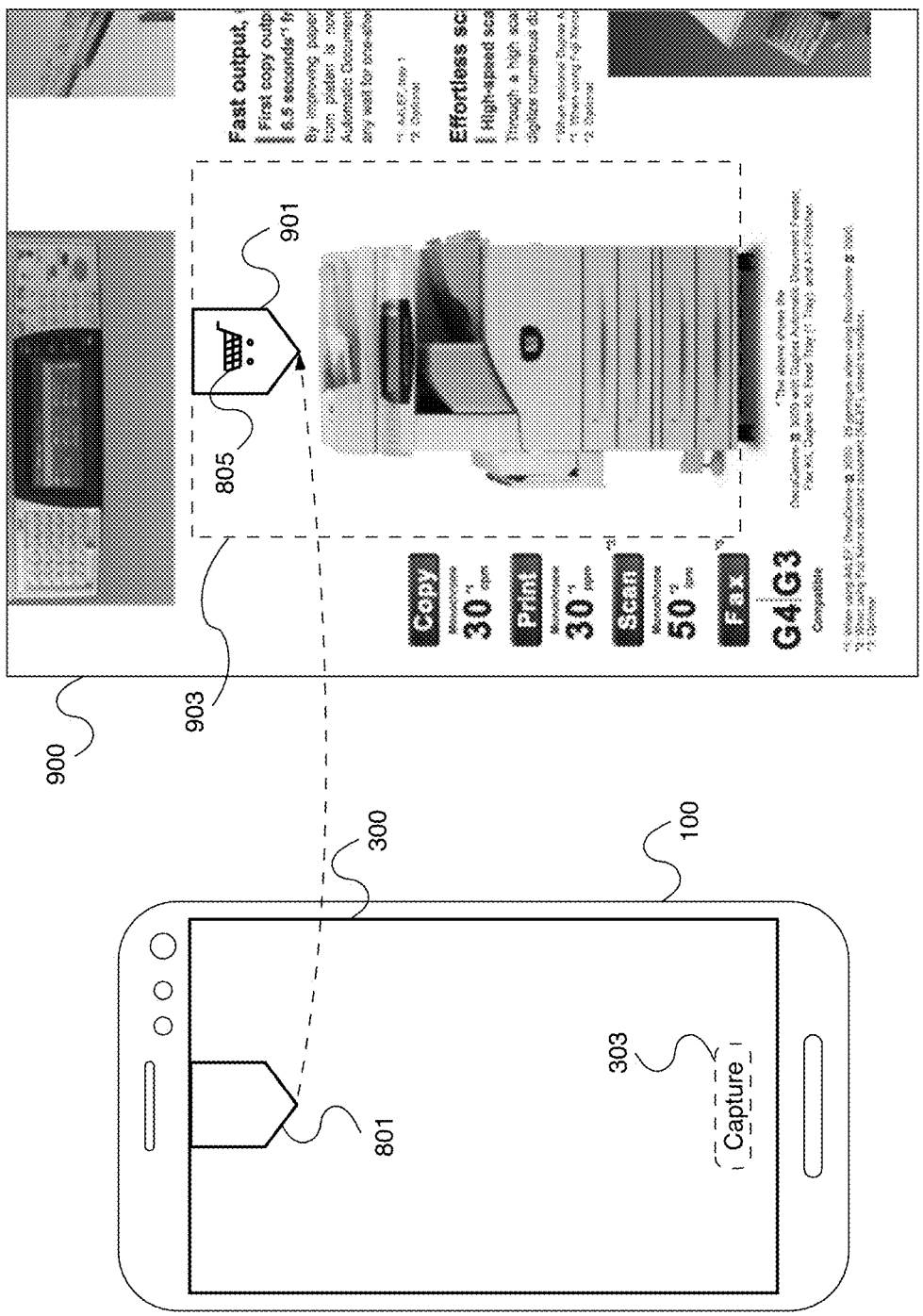
FIG. 9 illustrates a manner of use of another embodiment of a graphical user interface generated by the graphical user interface generation module in connection with another exemplary embodiment of an off-center embedded media marker.

As with the embodiments shown in FIG. 7, different sight elements 801, 802, 803 and 804 shown in FIG. 8 and the corresponding off-center embedded media markers may be used by the user to view different types of media or activate different tools or functions associated with the same region of interest. For example, as shown in FIG. 9, the user aligns the sight element 801 with the marker 901 in the document 900, which has a matching boundary shape. In the shown example, the media or function type indicator 805 is printed on the marker 901, but is not included within the sight element 801. In one or more embodiments, the computerized system 100 may be configured to automatically detect the alignment of the matching boundaries of the sight element 801 with the marker 901 and thereupon to automatically initiate acquisition of the image by the camera 111 within its field of view 903. Alternatively, the capture button 303 may be used by the user. The available media, other content, tool or function selected by the user is determined based on the features of the image acquired by the camera 111, as described in detail below. Additionally, the computerized system 100 may be configured to use the image of the marker boundary 901 acquired by the camera 111 to determine the user's selection upon the alignment with the corresponding sight element 801.

Figure 10:
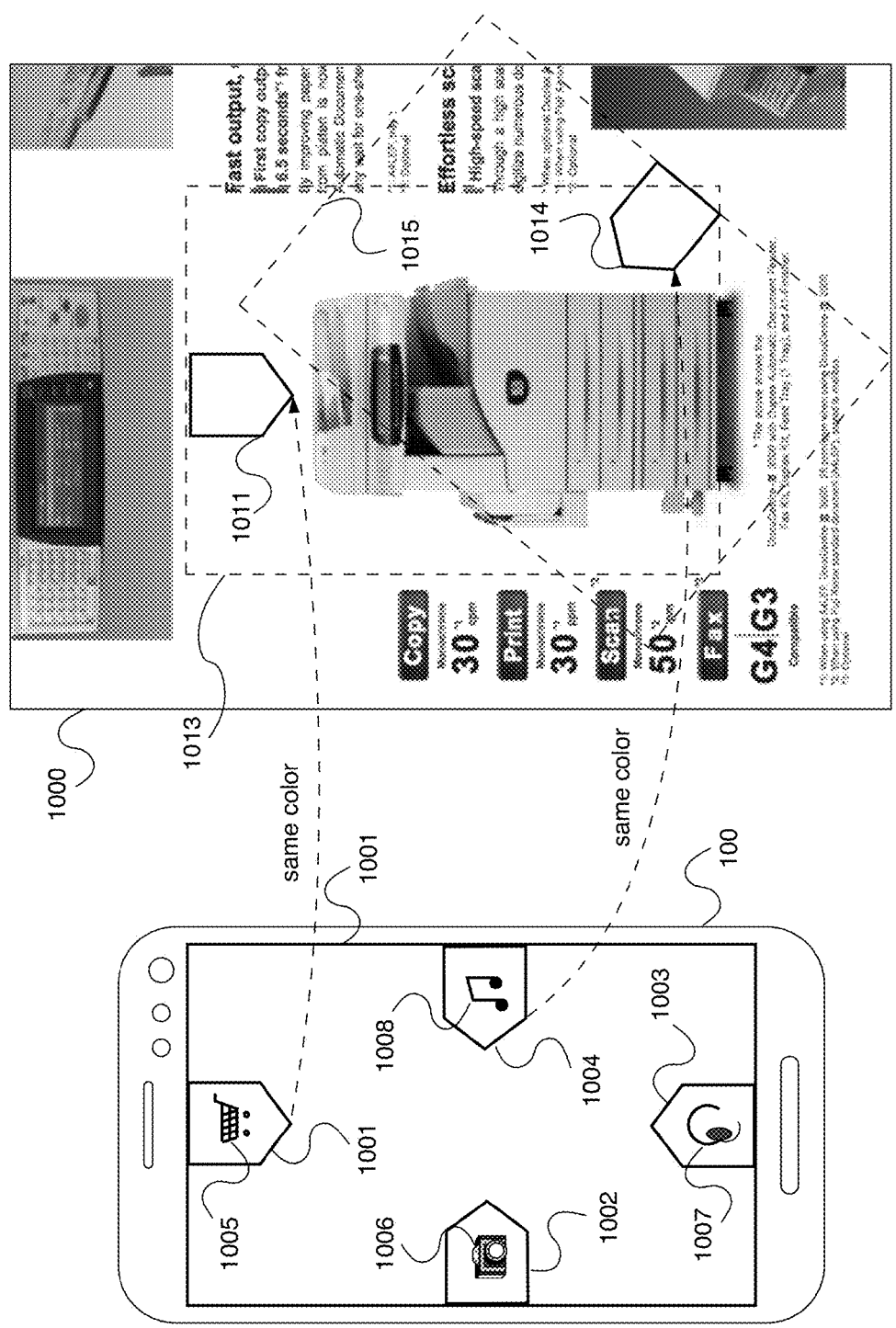
FIG. 10 illustrates a manner of use of yet another embodiment of a graphical user interface generated by the graphical user interface generation module in connection with another exemplary embodiment of an off-center embedded media marker.

FIG. 10 illustrates another exemplary embodiment of a graphical user interface 1001, in which the sight elements 1001, 1002, 1003 and 1004 all have the same boundary shape but different boundary colors. Unlike the embodiment shown in FIG. 9, the sight elements 1001, 1002, 1003 and 1004 shown in FIG. 10 are decorated with media or function type indicators 1006, 1007 and 1008, while the markers 1011 and 1014 are not so decorated. The user aligns the sight element 1001 with the marker 1011, which has the same boundary color. In one or more embodiments, the computerized system 100 may be configured to automatically detect the alignment of the matching boundaries of the sight element 1001 with the marker 1011 having the same boundary color and thereupon to automatically initiate acquisition of the image by the camera 111 within its field of view 1013. Alternatively, the user may align the sight element 1004 with the marker 1014, which also have the same colors. The camera's 111 field of view within the document 1000 in this configuration is indicated by numeral 1015. The computerized system 100 is configured to determine user's selection based on the features of the image taken by the camera 111. Additionally, the shape and color of the marker's boundary in the camera's image may also be used for this purpose.

Figure 11:
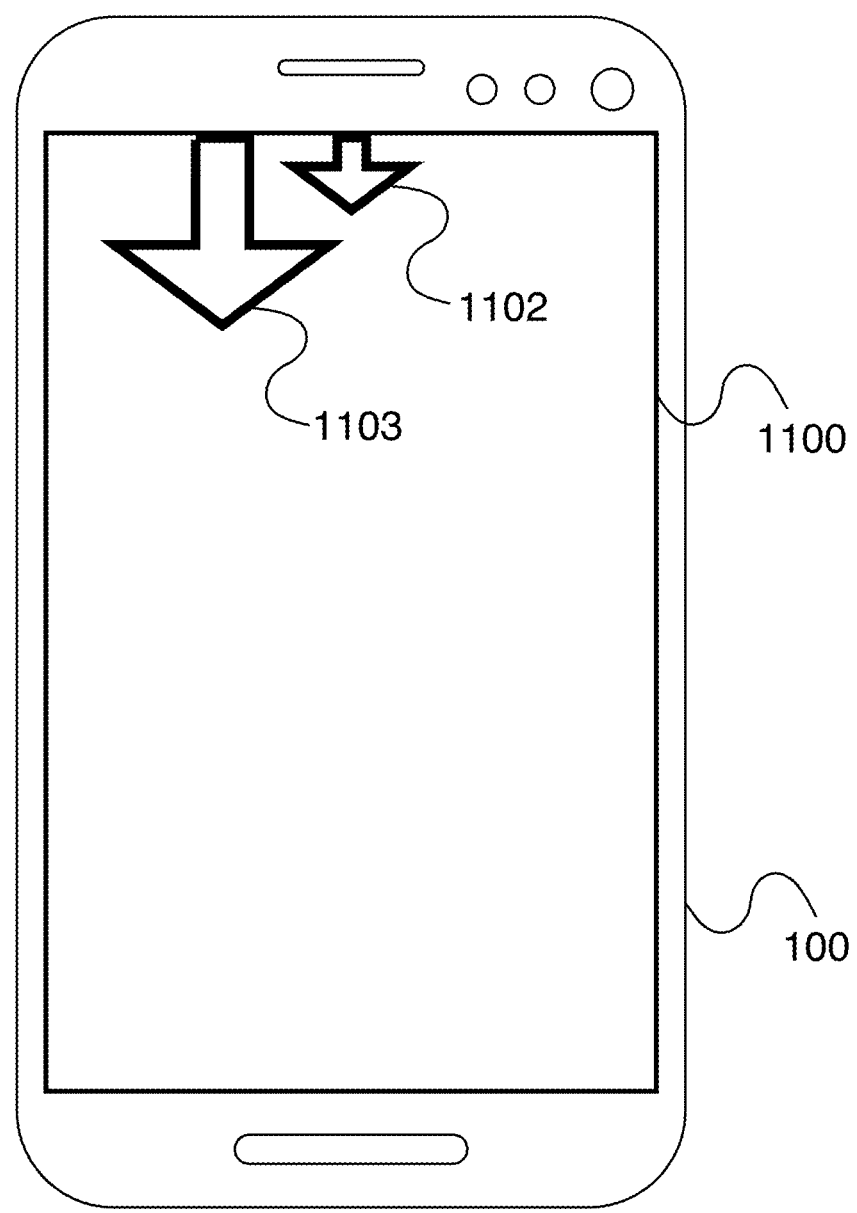
FIG. 11 illustrates yet another exemplary embodiment of a graphical user interface generated by the graphical user interface generation module.
Figure 12:
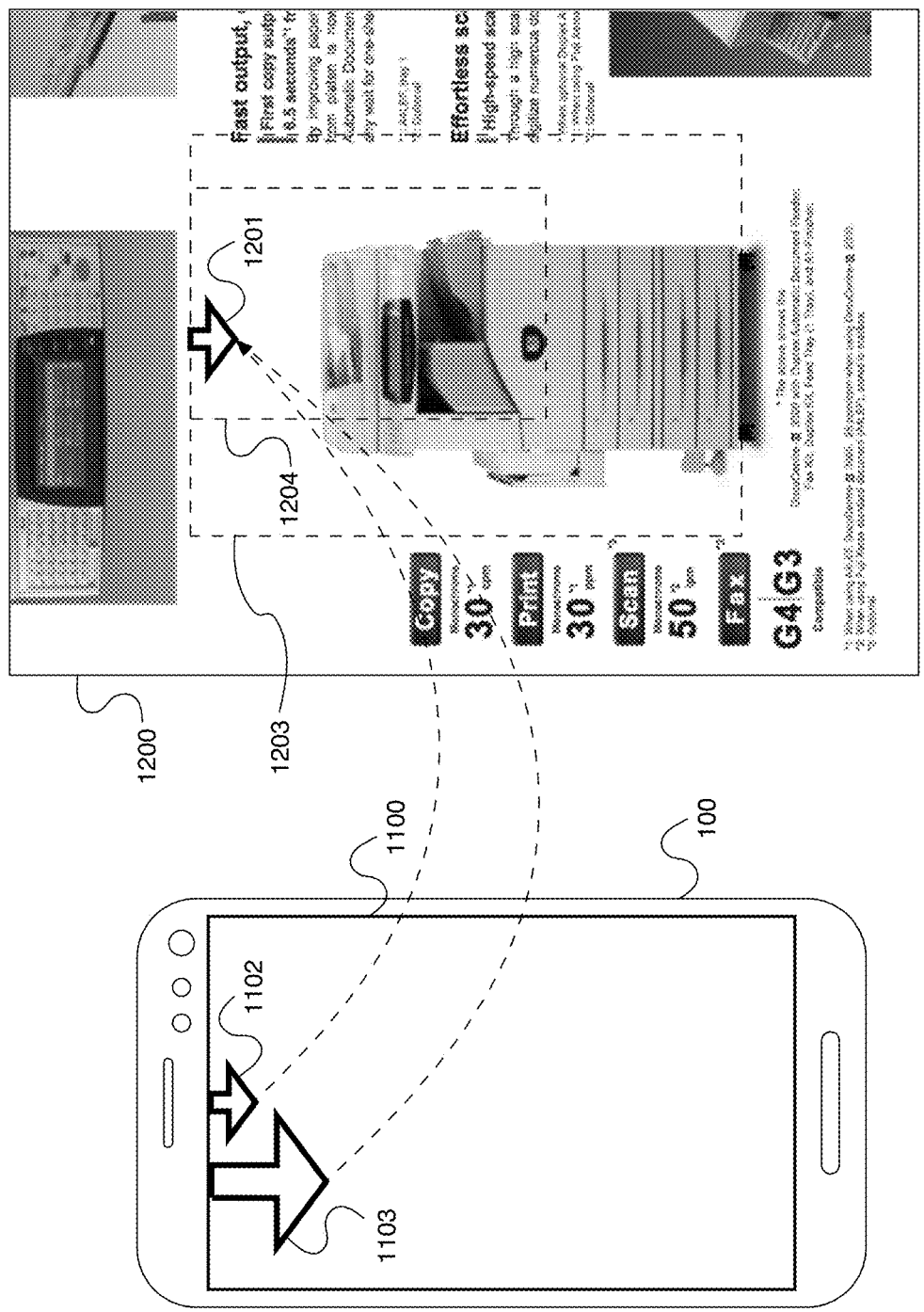
FIG. 12 illustrates a manner of use of the graphical user interface of FIG. 11 in connection with yet another exemplary embodiment of an off-center embedded media marker.

In one or more embodiments, the computerized system 100 may also compensate capture scales when the off-center embedded media marker printout on a hardcopy document or other article is spatially restricted. This is accomplished by using sight elements having different colors and shapes. FIG. 11 illustrates an exemplary embodiment of a graphical user interface 1100 using two different sight elements 1102 and 1103 having different sizes and colors to adjust the image capture scale. The use of this embodiment is illustrated in connection with FIG. 12. When the sight element 1102 is aligned with the marker 1201 of the same color, the field of view of the camera 111 is the rectangle 1203, the image of which will be captured. On the other hand, when the marker 1201 is colored in the same color as the (larger) sight element 1103, the user has to put the camera 111 much closer to the document 1200 to achieve the alignment, and the image capture region is the rectangle 1204, which is substantially smaller than the region 1203. In other words, larger sight element corresponds to smaller image capture region and vice versa. In one or more embodiments, the sight elements 1103 and 1102 are associated with two different user selections and the computerized system 100 is configured to determine the user selection using the image acquired by the camera 111.

Even though the embodiments of the inventive techniques described herein combine sights and printed media markers, embodiments of the inventive off-center embedded media markers are different from both of them. As would be appreciated by those of skill in the art, the use of traditional gun sights focuses on aligning three points in one line and therefore may be considered as one dimensional alignment task. Conventional embedded media markers emphasize aligning a capture region and a camera view and therefore their use may be considered as a two dimensional alignment problem. On the other hand, embodiments of the inventive off-center embedded media markers expand the alignment to a multiple-feature space, which may include shape, color, size, orientation, and the like features. Such expansion provides users with more freedom when one feature space is restricted by application scenarios.

Figure 13:
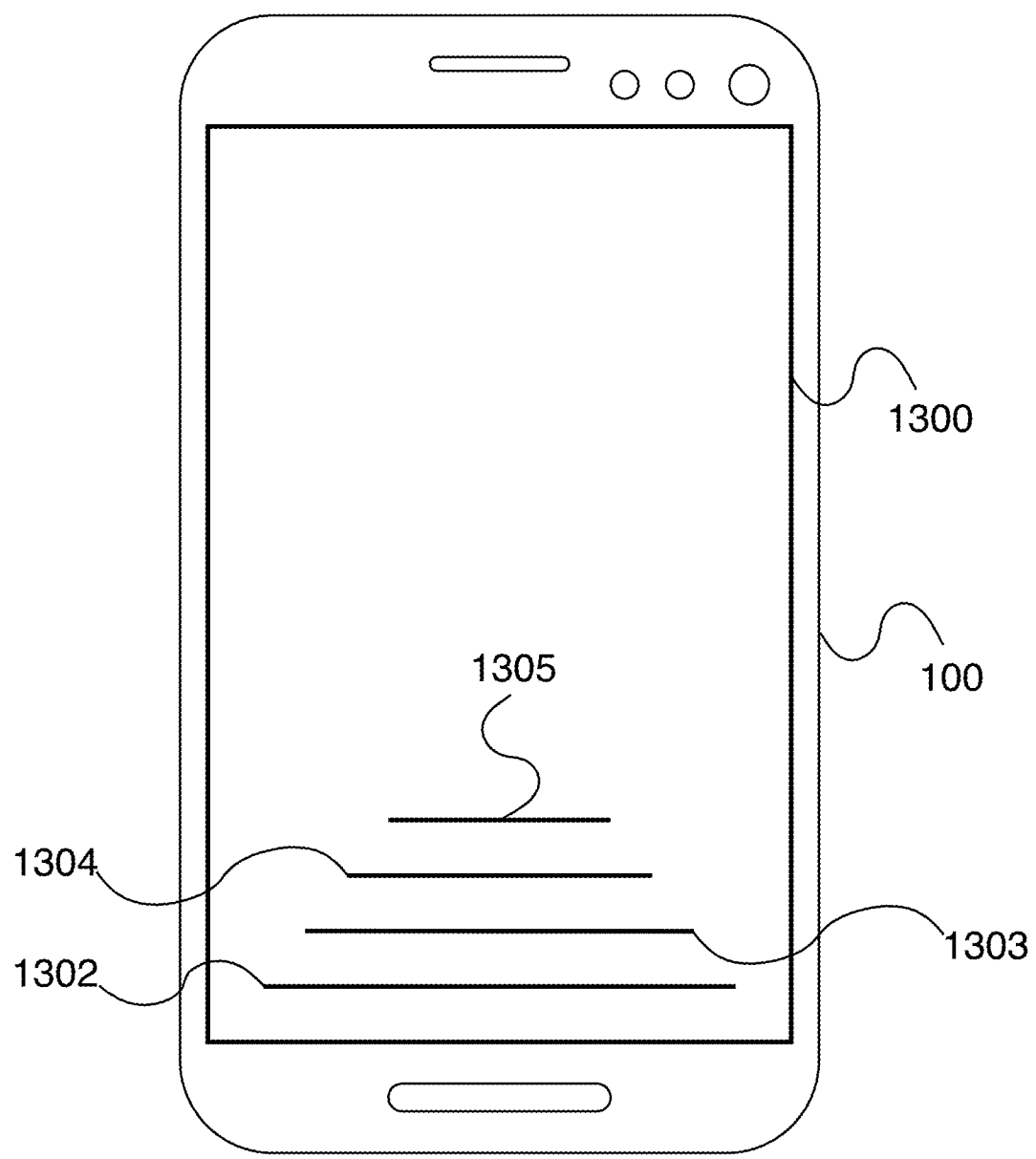
FIG. 13 illustrates yet another exemplary embodiment of a graphical user interface generated by the graphical user interface generation module.
Figure 14:
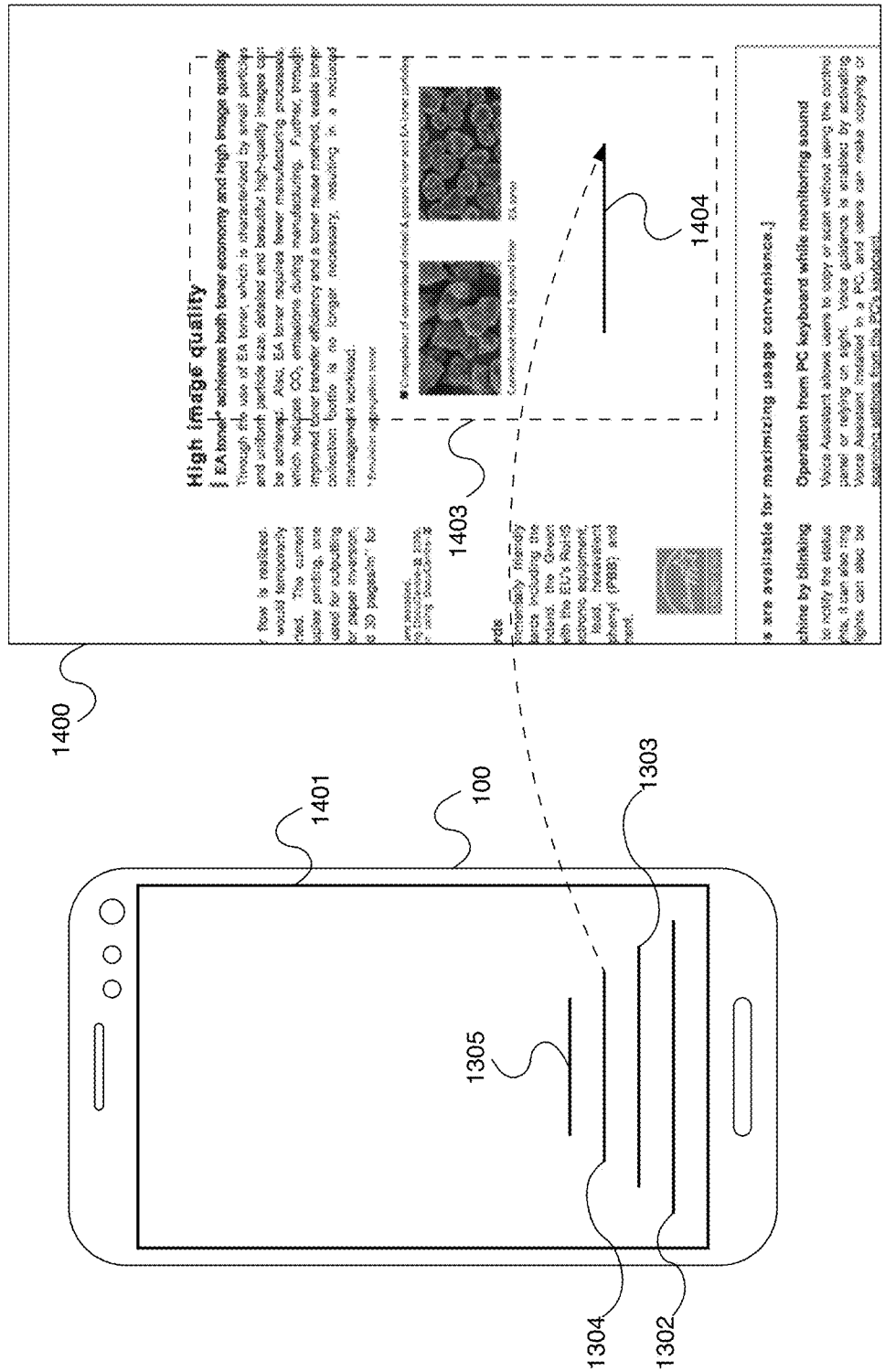
FIG. 14 illustrates a manner of use of the graphical user interface of FIG. 13 in connection with yet another exemplary embodiment of an off-center embedded media marker.

In one or more embodiments, to reduce the printed space occupied by an off-center embedded media marker, the marker and the corresponding sight element are arranged as one-dimensional colored line segments, as illustrated in FIG. 13. Specifically, an embodiment of the graphical user interface 1300 shown in FIG. 13 includes four sight elements 1302, 1303, 1304 and 1305, each having a different color and length. In one or more embodiments, each of the sight elements 1302, 1303, 1304 and 1305 may be associated with a different media, other content, tool or function. The use of this embodiment is illustrated in connection with FIG. 14. As shown in that figure, the sight element 1304 is aligned with a marker 1404, which has the same shape and color as the sight element 1304. This causes the camera 111 to acquire an image of a portion of a document 1400 within its field of view 1403, which is subsequently used by the application 117 to determine which of the sight elements 1302, 1303, 1304 and 1305 has been aligned with the marker 1404, as well as the corresponding user selection. It should be noted that the media or function type indicator may be placed either on the paper document 1400, in the vicinity of the marker 1404, or within the graphical user interface 1300 next to the corresponding sight element 1304.

Figure 15:
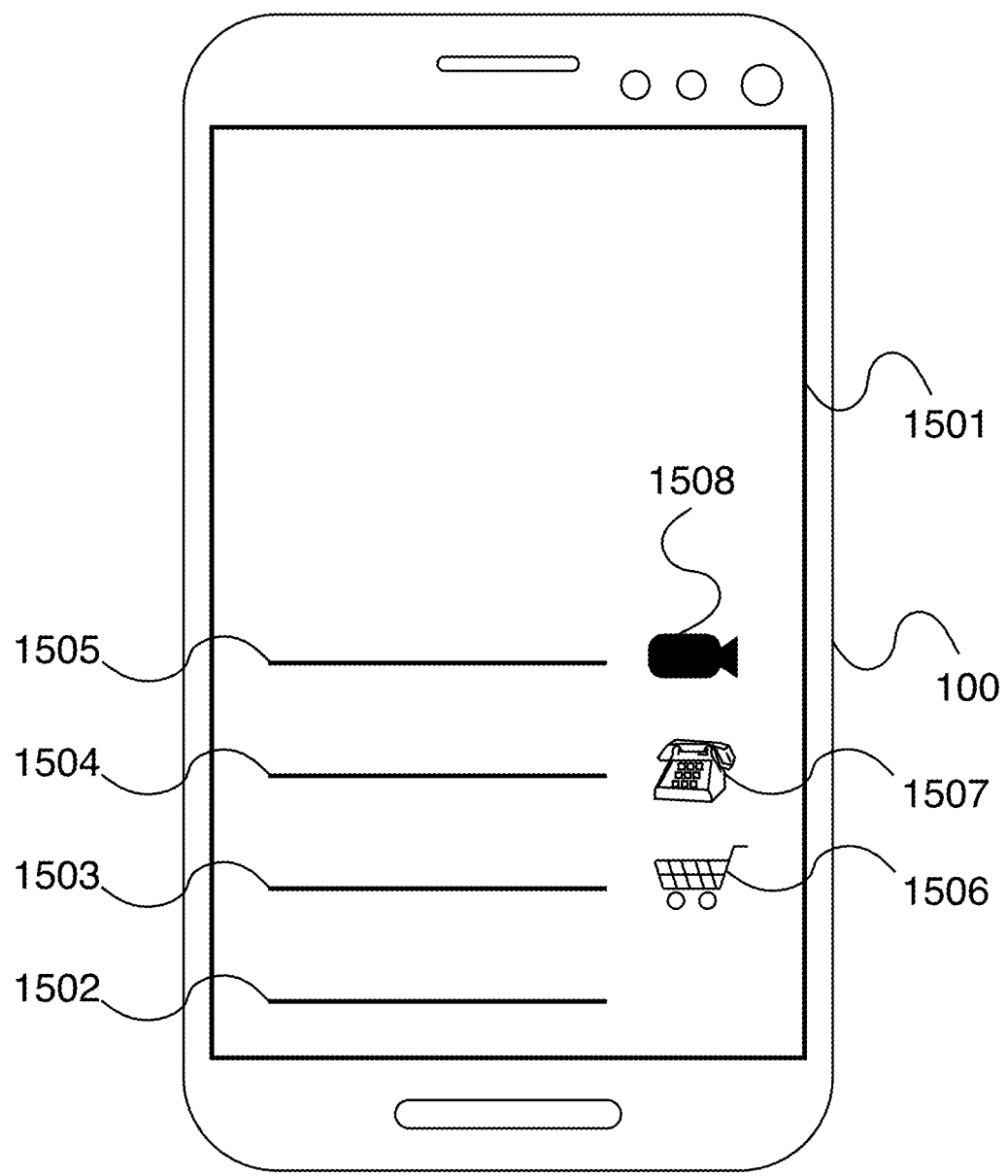
FIG. 15 illustrates yet another exemplary embodiment of a graphical user interface generated by the graphical user interface generation module.
Figure 16:
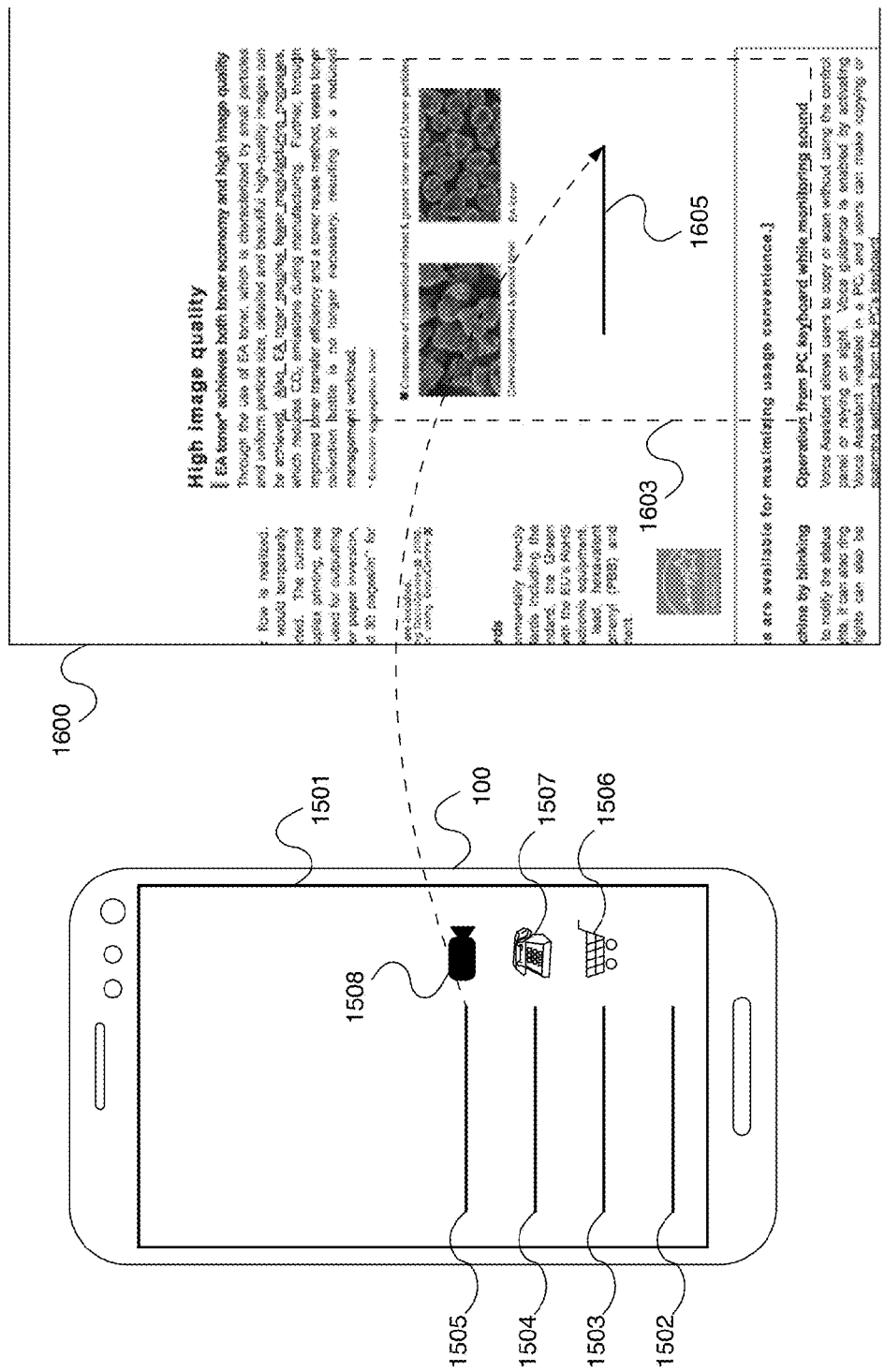
FIG. 16 illustrates a manner of use of the graphical user interface of FIG. 15 in connection with yet another exemplary embodiment of an off-center embedded media marker.

In one or more embodiments, to further reduce the printing space occupied by the embedded media marker in very spatially restricted applications, the media or function type indicator may not be placed on a hardcopy document and may only be shown on the display 109 of the computerized system 100, as illustrated, for example, in FIG. 15. As shown in this figure, media or function type indicators 1506, 1507 and 1508 are placed next to corresponding sight elements 1503, 1504 and 1505 of the graphical user interface 1501 (sight element 1502 has no media indicator). The sight elements 1502, 1503, 1504 and 1505 each have different colors. The use of this embodiment of the graphical user interface 1501 is illustrated in FIG. 16. Specifically, sight element 1505 is aligned with marker 1605 of the same color. Upon such alignment, the camera 111 acquires an image of a portion of a document 1600 within its field of view 1603.

As it would be appreciated by those of skill in the art, various embodiments of the off-center embedded media markers described herein are related to fiduciary markers used for visual tracking in augmented reality, which are well known to persons or ordinary skill in the art. Unlike fiduciary markers that are designed for computer based visual tracking, various embodiments of the sight element and printed marker described hereinabove are specifically designed for guiding human users' media marker capture. Because human users have much better ability to align small shapes without data encoding, various embodiments of the off-center embedded media markers can normally be designed much less intrusive than fiduciary markers used by machines. Moreover, fiduciary markers used for augmented reality are mainly used for tracking the same object while the marker-sight element pair described herein can be used for many different media or functional links. Additionally, because traditional fiduciary markers are designed for a machine, they are normally not meaningful to a human. On the other hand, various embodiments of the off-center embedded media markers are specifically designed to be visible and meaningful to a human.

Figure 17:
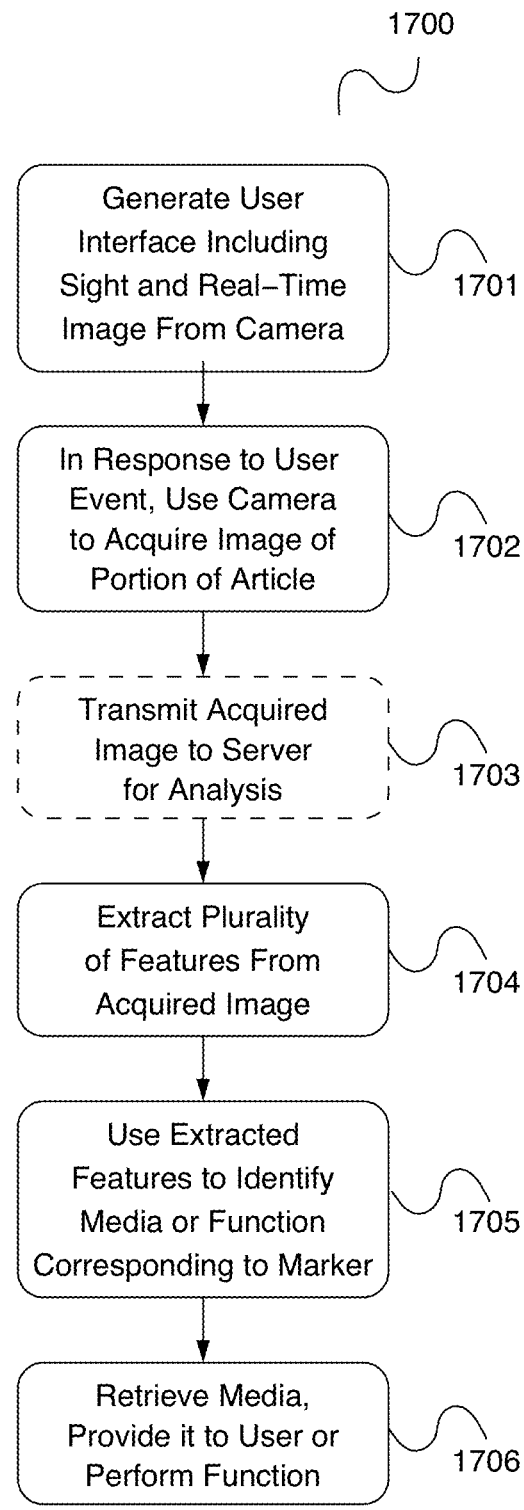
FIG. 17 illustrates an exemplary operating sequence of an off-center embedded media marker application.

FIG. 17 illustrates an exemplary operating sequence 1700 of the off-center embedded media marker application 117. Initially, at step 1701, the graphical user interface generation module 118 generates a graphical user interface on the display 111 of the computerized system 100. The generated graphical user interface includes at least one sight element and at least a portion displaying a real-time video from the camera 111, as shown, for example, in FIGS. 3 and 5. After that, in response to detection of a user-generated event, such as user's activation of the capture button 303, the image capture module 119 acquires an image within the field of view of the camera 111. In an alternative embodiment, the aforesaid image may be acquired automatically, upon detection of the proper alignment of the sight element with the off-center embedded media marker.

Optionally, the acquired image may be transmitted at step 1703 by the computerized system 100 to the computerized server system 200, which may have more image processing power for analyzing the image. At step 1704, a plurality of features are extracted from the acquired image. In various embodiments, the extracted features may include edges, corners and ridges, word bounding boxes or image keypoints, such as scale-invariant feature transform (SIFT) keypoints, well known to persons of ordinary skill in the art. In certain embodiments, when only a single marker corresponds to the specific region or interest, rotation-invariant image features may be used for identifying the acquired image. In other, alternative embodiments, rotation-sensitive image features must be used. The extracted image features are used at step 1705 to identify media, other content, tool or function associated with the selected off-center embedded media marker. Additionally or alternatively, the aforesaid identification step may be performed by comparing the acquired image with a set of candidate indexed images stored in a database, such as the database 216, using, for example, techniques described for in U.S. Patent Application Publication No. 2012/0269439. Specifically, a two-tier comparison may be used, including a first coarse comparison at a low resolution and a second refining comparison at a higher resolution. Each candidate image stored in the database may be associated with a specific media, other content, tool or function and the positive image match between the candidate image and the acquired image would uniquely identify such media, other content, tool or function.

If the image analysis was performed at the computerized server system 200, the information on the identified subject matter may be sent by the computerized server system 200 back to the computerized system 100, where the corresponding media or content may be retriever by the media retrieval module 121 or the selected function may be performed by other modules of the system 100. In an alternative embodiment, the computerized server system 200 may be configured to send the corresponding media object itself to the computerized system 100.

Figure 18:
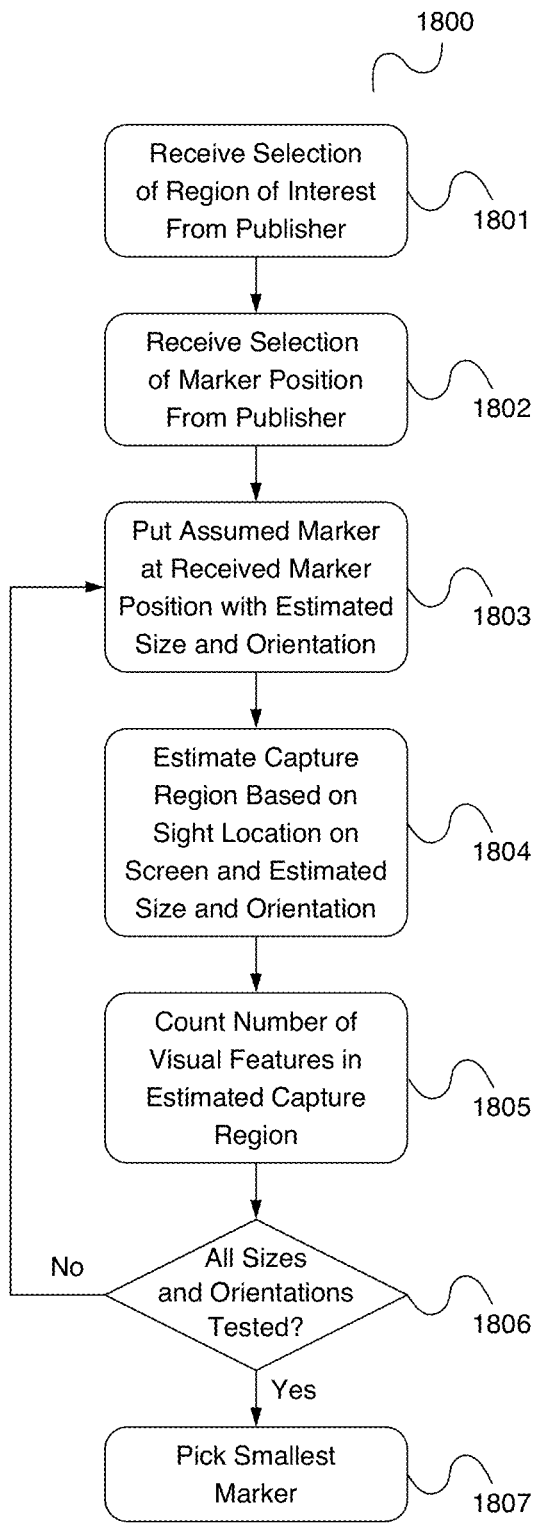
FIG. 18 illustrates an exemplary embodiment of an iterative process for authoring the inventive off-center embedded media markers.

In one or more embodiments, to provide proper guidance to users' image capture of a predefined region with a proper number of visual features, the off-center embedded media marker is printed with the correct color, size, and orientation. The marker color may be easily chosen based on the color of the corresponding sight element. However, the size and orientation of the marker are not easily determinable by a human. FIG. 18 illustrates an exemplary embodiment of an iterative process 1800 for authoring the inventive off-center embedded media markers. Initially, at step 1801, the selection of a region of interest is received from the publisher. In addition, at step 1802, the position of the off-center embedded media marker is also received. The process then estimates the size and orientation of the marker and puts the assumed marker with the estimated size and orientation, see step 1803. At step 1804, the process estimates the image capture region based on the sight element location and size on the display 111 as well as the estimated size and orientation of the marker itself. Subsequently, the number of visual features in the estimated capture region is counted at step 1805. The iterative process then varies the size and orientation of the marker at step 1806 to achieve the necessary number of features or number of distinctive features within the corresponding invisible image capture region while minimizing the intrusiveness impact of the marker on the original document. Finally, the smallest, least intrusive marker is picked at step 1807.

In an alternative embodiment, the publisher may specify the region of interest. Subsequently, the embodiment of the authoring system will automatically find blank space around the specified region of interest and adjust the marker location, orientation, and size to define a proper invisible image capture boundary that meets requirements similar to the requirements for conventional embedded media markers well known to persons of skill in the art.

In one or more embodiments suitable for a smartphone deployment, the sight element may have the dimensions of 48-by-64 pixels. The aforesaid sight element may be positioned near the edge of the smartphone display, which may have resolution of 480-by-640 pixels. Depending on the intended capture area to achieve sufficient number of visual features, the marker size, location, and orientation is adjusted by the aforesaid off-center embedded media marker authoring tool. In one embodiment, the intended image capture area on the paper document is 4" by 3". Based on the above input parameters, the marker size on the paper is calculated to be: 4"×(64 pixel/640 pixel)=0.4" by 3"×(48 pixel/480 pixel) =0.3". It should be noted, however, that the inventive techniques are not limited to any particular sizes of the markers or sight elements.

As it would be appreciated by persons of skill in the art, the inventive off-center embedded media markers, such as the marker 401 shown in FIG. 4, may be placed in such locations within the document as not to overlay any important visual features of the document. Thus, these inventive markers need not be nearly-transparent or semi-transparent, which can simplify printing of such markers in comparison with conventional embedded media markers which are required to overlay visual features of documents, as described, for example, in the aforesaid U.S. Patent Application Publication No. 2011/0154174. For example, the use of the inventive off-center embedded media marker would permit the use of such markers on black-and-white documents.

Also, as it would be appreciated by those of skill in the art, cameras of different devices may have different characteristics related to image capture. Thus, in one or more embodiments, the size of the sight element 301 may be adjusted based on the specific parameters of the camera 111 of a particular system 100 to ensure that a region with the proper number of visual features is within the field of view 403 of the particular camera 111. To this end, appropriate adjustment coefficients for various types of cameras 111 and/or systems 100 may be stored in the data storage 122.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the system and method for implementing and using off-center embedded media markers. It is intended that the specification and examples be considered as exemplary only, with a true scope and spirit of the invention being indicated by the following claims.

What is claimed is:

1. A computer-implemented method performed in a computerized system comprising a central processing unit, a display device, a camera and a memory, the method being performed in connection with an article comprising a content provided on the surface of the article and a marker, the marker being associated with a first portion of the content provided on the surface of the article, the method comprising:
   a. using the display device to generate a graphical user interface, the user interface comprising a sight element and a live video portion;
   b. upon alignment of the sight element and the marker, using the camera to acquire an image of a second portion of the content within a field of view of the camera;
   c. extracting a plurality of image features from the acquired image; and
   d. using the extracted plurality of image features to identify a media or a function associated with the marker, wherein the marker is disposed completely outside of an area occupied by the content on the surface of the article.

2. The computer-implemented method of claim 1, further comprising automatically detecting the alignment of the sight element and the marker.

3. The computer-implemented method of claim 1, wherein the sight element is arrow-shaped.

4. The computer-implemented method of claim 1, wherein the sight element has a shape of a line segment.

5. The computer-implemented method of claim 1, wherein the generated graphical user interface comprises a second sight element, the second sight element having a different orientation from the sight element.

6. The computer-implemented method of claim 1, wherein the generated graphical user interface comprises a second sight element having a second size, wherein the second size is different from a first size of the sight element.

7. The computer-implemented method of claim 1, wherein the generated graphical user interface comprises a second sight element having a second boundary shape, wherein the second boundary shape is different from a first boundary shape of the sight element.

8. The computer-implemented method of claim 1, wherein the generated graphical user interface comprises a second sight element having a second color, wherein the second color is different from a first color of the sight element.

9. The computer-implemented method of claim 1, wherein the generated graphical user interface comprises a second sight element and wherein the sight element comprises a first indicator element indicative of a first type of media or function associated with the sight element and the second sight element comprises a second indicator element indicative of a second type of media or function associated with the second sight element and wherein the first indicator element is different from the second indicator element.

10. The computer-implemented method of claim 1, wherein the generated graphical user interface comprises a second sight element and wherein the sight element is associated with a first media or function and the second sight element is associated with a second media or function, the first media or function and the second media or function being identifiable using the extracted plurality of image features.

11. The computer-implemented method of claim 1, further comprising retrieving the identified media or performing the identified function.

12. A computer-implemented method performed in a computerized system comprising a central processing unit, a display device, a camera and a memory, the method being performed in connection with an article comprising a content provided on the surface of the article and a marker, the marker being associated with a first portion of the content provided on the surface of the article, the method comprising:
   a. using the display device to generate a graphical user interface, the user interface comprising a sight element and a live video portion;
   b. upon alignment of the sight element and the marker, using the camera to acquire an image of a second portion of the content within a field of view of the camera;
   c. transmitting the acquired image to a computerized server system for analysis;
   d. receiving from the computerized server system information on the identity of a media or a function associated with the marker, wherein the marker is disposed completely outside of an area occupied by the content on the surface of the article.

13. The computer-implemented method of claim 12, further comprising receiving the media associated with the marker from the computerized server system.

14. A tangible article comprising:
   a. content provided on a surface of the article; and
   b. a marker provided on the surface of the article, the marker associated with a first portion of the content provided on the surface of the article, wherein a size and an orientation of the marker is such that upon alignment of the marker with an element of a graphical user interface of an electronic device comprising a camera, the camera of the electronic device is positioned to acquire an image of a second portion of the content provided on the surface of the article, the second portion of the content comprising a plurality of image features sufficient to allow automated identification of the marker and the first portion of the content by extracting the plurality of image features and using the extracted plurality of image features for the identification of the marker and the first portion of the content and wherein the marker is disposed completely outside of an area occupied by the content on the surface of the article.

15. The article of claim 14, wherein the first portion of the content is the same as the second portion of the content.

16. The article of claim 14, wherein the marker comprises an indicator element indicative of a type of content or function associated with the marker and the first portion of the content.

17. The article of claim 14, wherein the article is a two dimensional surface medium.

18. The article of claim 14, wherein the marker comprises an arrow pointing in the direction of the first portion of the content.

19. The article of claim 14, wherein the marker has a shape of a line segment.

20. The article of claim 14, further comprising a second marker associated with the first portion of the content.

21. The article of claim 14, wherein a first boundary shape of the marker is different from a second boundary shape of the second marker.

22. The article of claim 14, wherein a first boundary color of the marker is different from a second boundary color of the second marker.

23. The article of claim 14, wherein the marker is associated with a first media or function and the second marker is associated with a second media or function.

24. The article of claim 14, wherein the marker comprises a first indicator element indicative of a first type of media or function associated with the marker and the second marker comprises a second indicator element indicative of a second type of media or function associated with the second marker and wherein the first indicator element is different from the second indicator element.

25. A computer-implemented method performed in a computerized system comprising a central processing unit and a memory, the method being performed in connection with an article comprising a content provided on the surface of the article, the method comprising:
   a. receiving a selection of a first portion of the content;
   b. receiving a selection of a position of a marker;
   c. determining a size and orientation of the marker;
   d. placing the marker at the received position of the marker using the determined size and orientation of the marker;
   e. estimating a second portion of the content, wherein an image of the second portion of the content would be acquired upon alignment of the marker with an element of a graphical user interface of an electronic device comprising a camera;
   f. counting a number of visual features in the second portion of the content; and
   g. determining whether the counted number of visual features is sufficient for identification of the marker, wherein the marker is disposed completely outside of an area occupied by the content on the surface of the article.

26. The computer-implemented method of claim 25, wherein the first portion of the content is the same as the second portion of the content.

27. The computer-implemented method of claim 25, wherein the article is a two dimensional surface medium.

28. The computer-implemented method of claim 25, wherein the marker comprises an arrow pointing in the direction of the first portion of the content.

29. The computer-implemented method of claim 25, wherein the marker has a shape of a line segment.

30. The computer-implemented method of claim 25, further comprising repeating d. through f. for additional sizes and orientations of the marker and selecting the marker with the smallest size to minimize an intrusiveness of the marker on the content.

31. The computer-implemented method of claim 25, wherein the electronic device further comprises a display device and wherein in e. the second portion of the content is estimated based on a relative size of the element of the graphical user interface and the size of the display device.

32. The computer-implemented method of claim 25, wherein in e. the second portion of the content is estimated based on a relative size of the element of the graphical user interface and the size of an image capture region of the camera of the electronic device.

33. A non-transitory computer-readable medium embodying a set of computer-executable instructions, which, when executed in a computerized system comprising a central processing unit, a display device, a camera and a memory, in connection with an article comprising a content provided on the surface of the article and a marker, the marker being associated with a first portion of the content provided on the surface of the article, cause the computerized system to perform a method comprising:
   a. using the display device to generate a graphical user interface, the user interface comprising a sight element and a live video portion;
   b. upon alignment of the sight element and the marker, using the camera to acquire an image of a second portion of the content within a field of view of the camera;
   c. extracting a plurality of image features from the acquired image; and
   d. using the extracted plurality of image features to identify a media or a function associated with the marker, wherein the marker is disposed completely outside of an area occupied by the content on the surface of the article.

* * * * *